US012752420B2

(12) United States Patent
Kranski et al.

(10) Patent No.: US 12,752,420 B2
(45) Date of Patent: *Oct. 6, 2026

(54) EXPEDITED ROBOT TEACH-THROUGH INITIALIZATION FROM PREVIOUSLY TRAINED SYSTEM

(71) Applicant: Sanctuary Cognitive Systems Corporation, Vancouver (CA)

(72) Inventors: Jeff Kranski, Campbell, CA (US); Chris Cianci, Campbell, CA (US); Adrian Kaehler, Campbell, CA (US)

(73) Assignee: Sanctuary Cognitive Systems Corporation, Vancouver (CA)

( * ) Notice: Subject to any disclaimer, the term of this patent is extended or adjusted under 35 U.S.C. 154(b) by 35 days.

This patent is subject to a terminal disclaimer.

(21) Appl. No.: 18/967,325

(22) Filed: Dec. 3, 2024

(65) Prior Publication Data

US 2025/0091204 A1 Mar. 20, 2025

Related U.S. Application Data

(63) Continuation of application No. 17/495,544, filed on Oct. 6, 2021, now Pat. No. 12,157,226.

(51) Int. Cl.
*B25J 9/16* (2006.01)

(52) U.S. Cl.
CPC ............... *B25J 9/163* (2013.01); *B25J 9/161* (2013.01); *B25J 9/1615* (2013.01)

(58) Field of Classification Search
CPC .......... B25J 9/163; B25J 9/1615; B25J 9/161; G05B 2219/40499
See application file for complete search history.

(56) References Cited

U.S. PATENT DOCUMENTS

| | | | | |
|---|---|---|---|---|
| 10,919,152 | B1 * | 2/2021 | Kalouche | B25J 9/1697 |
| 2016/0059412 | A1 * | 3/2016 | Oleynik | G05B 19/42 700/250 |
| 2016/0096272 | A1 * | 4/2016 | Smith | B25J 9/163 700/255 |
| 2017/0305014 | A1 * | 10/2017 | Gildert | B25J 9/161 |
| 2018/0157973 | A1 * | 6/2018 | El-Yaniv | G06N 3/08 |
| 2019/0232489 | A1 * | 8/2019 | Pascanu | G06N 3/008 |
| 2022/0105625 | A1 * | 4/2022 | Guo | B25J 9/163 |

* cited by examiner

*Primary Examiner* — Wade Miles
*Assistant Examiner* — Mohammed Yousef Abuelhawa
(74) *Attorney, Agent, or Firm* — Adenike Adebiyi; Thomas Mahon

(57) ABSTRACT

Disclosed techniques for decreasing teach times of robot systems may obtain a first set of parameters of a first trained robot-control model of a first robot trained to perform a task and determine, based on the first set of parameters, a second set of parameters of a second robot-control model of a second robot before the second robot is trained to perform the task. In some cases, a plurality of sets of parameters from trained robot-control models of respective robots trained to perform a task may be obtained. Thus, for example, a convergence of values of those parameters on a value, or range of potential values, may be determined. Embodiments may determine values for parameters of the control model of the (e.g., second) robot to be trained within a range, or a threshold, based on values of corresponding parameters of the trained robot(s).

20 Claims, 6 Drawing Sheets

200

400

500

EXPEDITED ROBOT TEACH-THROUGH INITIALIZATION FROM PREVIOUSLY TRAINED SYSTEM

CROSS-REFERENCE TO RELATED APPLICATIONS

This application is a continuation of U.S. patent application Ser. No. 17/495,544 filed Oct. 6, 2021, the content of which is incorporated herein by reference.

BACKGROUND

1. Field

The present disclosure relates generally to robotics and, more specifically, to expediting training of machine-learning models for controlling robots.

2. Description of the Related Art

Dynamic mechanical systems are often controlled with computational processes. Examples include robots, industrial processes, life support systems, and medical devices. Generally, such a process takes input from sensors indicative of state of the dynamic mechanical system and its environment and determines outputs that serve to control various types of actuators within the dynamic mechanical system, thereby changing the state of the system and potentially its environment. In recent years, computational processes for controlling dynamic mechanical systems have been improved using machine learning. Machine learning techniques applicable to improving computational processes are, in many cases, and especially those concerning the control of complex dynamic mechanical system, highly specific to a given system.

Training an artificial intelligence model for controlling aspects of complex mechanical systems present particularly difficult challenges. Training a model, which often takes input from multiple other component models, is time consuming and challenging for even relatively simple (e.g., from the perspective of a human) tasks. As mechanical systems controlled by artificial intelligence models become even more complex, training operations can become extraordinarily time consuming and tedious. For example, training may include inputting instructions in a trial-and-error fashion until a model controlling processes of a system learns how to reach a desired state. Other systems, regardless of their relative similarity (e.g., what a layperson might even view as the same), can be so complex that a model trained for and with one system cannot simply be ported to control a second system to also reach the desired state. Indeed, even where there exists a high degree of similarity between two systems, existing approaches typically require training a model of each system on an individual basis to reach a desired state. Complex dynamical systems can have thousands, if not hundreds of thousands or millions or more possible states, and machine learning models to control those systems can have millions or billions or more parameters. While not all states (or even a majority) are reached directly during initial training of a model for controlling a complex mechanical system, reaching one, tens, or hundreds of desired states during initial training remains extraordinarily time consuming but necessary due to the lack of portability of trained models.

SUMMARY

The following is a non-exhaustive listing of some aspects of the present techniques. These and other aspects are described in the following disclosure.

Some aspects include a process that includes: obtaining, with a computer system, a first set of parameters of a first trained robot-control model of a first robot trained to perform a task; determining, with the computer system, based on the first set of parameters, a second set of parameters of a second robot-control model of a second robot before the second robot is trained to perform the task; training, with the computer system, the second robot to perform the task or another task by adjusting the second set of parameters of the second robot-control model based on performance of the second robot-control model in performing the task or another task; and storing, with the computer system, the second trained robot-control model of the second robot in memory.

Some aspects include a process that includes: obtaining, with a computer system, a plurality of sets of parameters from trained robot-control models of respective robots trained to perform a task; determining, with the computer system, based on the plurality of sets of parameters, a second set of parameters of a second robot-control model of a second robot before the second robot is trained to perform the task; training, with the computer system, the second robot to perform the task or another task by adjusting the second set of parameters of the second robot-control model based on performance of the second robot-control model in performing the task or another task; and storing, with the computer system, the second trained robot-control model of the second robot in memory.

Some aspects include a process that includes: obtaining, with a computer system, a first set of parameters of a first trained robot-control model of a first robot trained to perform a task; initializing, with the computer system, an intermediate robot-control model of a second robot with the first set of parameters; configuring, with the computing system, an untrained robot-control model of the second robot to receive, as input, outputs of the intermediate robot-control model based on the first set of parameters, the untrained robot-control model comprising a second set of parameters; training, with the computer system, the second robot to perform the task or another task by adjusting the second set of parameters of the second robot-control model based on performance of the intermediate robot-control model in performing the task or another task; and storing, with the computer system, a trained robot-control model of the second robot in memory.

Some aspects include a process that includes: obtaining, with a computer system, a plurality of sets of parameters from trained robot-control models of respective robots trained to perform a task; initializing, with the computer system, an intermediate robot-control model of a second robot with a first set of parameters based on the plurality of sets of parameters; configuring, with the computing system, an untrained robot-control model of the second robot to receive, as input, outputs of the intermediate robot-control model based on the first set of parameters, the untrained robot-control model comprising a second set of parameters; training, with the computer system, the second robot to perform the task or another task by adjusting the second set of parameters of the second robot-control model based on performance of the intermediate robot-control model in performing the task or another task; and storing, with the computer system, a trained robot-control model of the second robot in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
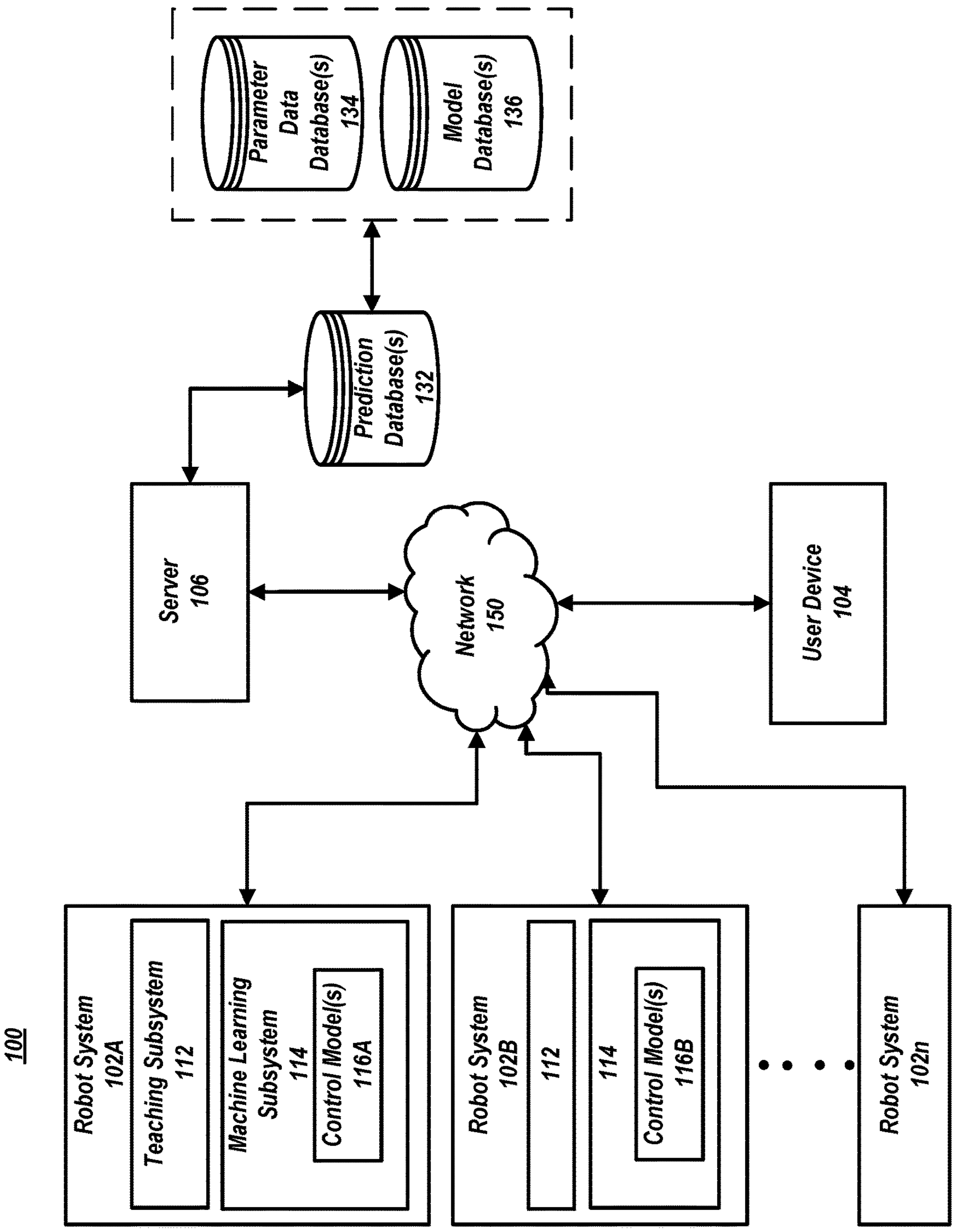
FIG. 1 is an example computing environment for expediting robot teach time through initialization based on previously trained systems in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of artificial intelligence and robotics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Training an artificial intelligence model to control a complex dynamical system, like a robot (such as a humanoid robot or self-driving vehicle), to learn a task is time consuming and challenging. Initial training techniques typically involve instructing a controller (and often multiple controllers) in communication with one or more actuators, sensors, or other robotic elements to perform actions (e.g., transitions between states) with the goal of completing some tasks and collecting feedback data corresponding to the completion of those tasks. In many cases, the controller may parse, pass, or otherwise convey instructions towards multiple other controllers constituent to a complex robotic system. Received feedback may be processed in accordance with a classification scheme to train a computer model (such as a neural network) to determine instructions for output in a feedback loop that receives feedback data as input based on or including the actuator data and the sensor data as the robot moves based on the output instructions to complete a task.

In some examples, reinforcement learning is applied to train a robot to complete some tasks. Reinforcement learning allows a robot to learn how to complete a task through many trial-and-error (e.g., real or simulated) attempts at completing the task. A reward model, which may include the classification of collected feedback data, may assign scores indicative of utility of the result when a task is performed or attempted. Through repeated actions the robot is trained (e.g., able to learn by adjustment to parameters of one or more models, like weights and biases of a neural network embodying a policy of a reinforcement learning model) to perform actions that maximize the reward and avoid actions that lead to penalties or lower rewards.

Minor variances (e.g., differences) between robots, even though two robots might otherwise be two instances of the same model of robot, can prevent direct portability of a trained model. Similar challenges arise from variation in tasks and environment encountered by such instances of the robot. As a result, each robot, regardless of the degree of similarity between two robots (e.g., of the same design), typically requires extensive individual training to perform a same or similar task, let alone a different task. For example, differences in sensor measurements, physical resistance or elasticity of linkages, lengths and orientation of actuators and linkages, orientation of components, and environmental conditions, among other factors, can produce minor variations that produce different minima or maxima of an objective function in parameter space of their control models. In other words, a trained model for one robot may not be suitable for another instance of that robot, another environment of the same robot, or another task for the same robot. As a result, even with recent advances in robotics and machine learning, it is still difficult to train a robot to perform tasks.

It may take a long time (e.g., enough to accumulate more than several thousand examples) to train a robot to perform a task and even after training, a robot may not perform a task consistently. Training is typically implemented for each instance of a robot, often under supervision of a human operator (e.g., often remotely with the robot on-location), so that one or more artificial intelligence models controlling the robot can learn the behavior of the specific robot and a task within the relevant environment. The number of training examples often needed for adequate performance in a new task, environment, or robot is generally difficult to attain with human supervision. For example, the period of time consumed to take a fresh-from-the-box automation system and teach it to perform the task for the first time is sometimes referred to as a robot teach period, and often can have a substantial time and effort cost in terms of expert calibration, tuning, adjustments for the work environment, etc., and so minimization to this portion of the process is very valuable for industrial applications. The discussion of disadvantages of some approaches, however, should not be read to imply that any subject matter is disclaimed.

Example embodiments may reduce the amount of training data needed by using transfer learning to expedite teaching of a task to a robot, in some cases, across instances of a robot, across environments for the same or different robots, or across tasks for the same or different robots. In some cases, sub-models may be used for transfer learning, or in some cases, entire robot-controller models may be used for transfer learning. In some cases, the number of training examples needed for a different (relative to that on which the transferred model was trained) task on a different robot in a different environment may be less than 500, 200, 100, or 50. Some subsequent training on the different task on the different robot in the different environment may further make the resulting trained model less brittle and more capable of generalizing relative to techniques that merely copy over models without further training. In some cases, model parameters may be copied over and then those parameters may themselves be adjusted through further training, or in some cases, model parameters may be copied over and then embodiments may train a downstream error-correcting model that adapts outputs of the transferred model for the new use case.

Some embodiments may obtain a plurality of first sets of such parameters of a plurality (e.g., a fleet) of trained robot-control models, in some cases, trained in a diversity of tasks or environments for a plurality of instances of a robot (or the same robot over time). Some embodiments may use the collective experience of these models to expedite teaching of an instance of the robot in a new task or environment. Some embodiments may select a best-fit among these pre-trained models to use as a starting point when training a new model, e.g., by using an objective function to select a closest match (e.g., initially scoring most optimal with the objective function) to the new task, robot instance, or environment. Or some embodiments may average (or use some other measure of central tendency of) parameters of these initial models as a starting point in subsequent training. Some embodiments may determine which parameters vary the most among the initial models and bias adjustment during training of a new model toward changing parameters that with the most statistical dispersion (e.g., more than a threshold variance) among the population of initial models, e.g., by increasing a temperature variable in a simulated annealing algorithm with determining these values during subsequent training, by increasing a step size in parameter adjustments between training iterations in stochastic gradient descent, or varying initial values more expansively in stochastic gradient descent, or the like.

Some embodiments may obtain a first set of parameters of a first trained robot-control model of a first robot trained to perform a task and determine, based on the first set of parameters, a second set of parameters of a second robot-control model of a second robot before the second robot is trained to perform the task. In some cases, a plurality of sets of parameters from trained robot-control models of respective robots trained to perform a task may be obtained. Thus, for example, a convergence of values of those parameters on a value, or range of potential values, may be determined. Some embodiments may determine values for parameters of the control model of the (e.g., second) robot to be trained within a range, or a threshold, based on values of corresponding parameters of the trained robot(s). Some embodiments may randomize values of a parameter within a range or a threshold over a number of iterative training sequences to determine a convergence on a parameter value during training of the control model of the second robot to reduce the risk of a local minima or maxima. In turn, training of the second robot to perform the task or another task may include adjusting parameters of the second robot-control model based on performance of the second robot-control model in performing the task or another task.

Determining a region of convergence for a parameter among a set of robots may guide an initial parameter selection for a start-up teach period of a new (e.g., untrained) robot within that generally valid parameter value region is expected to expedite robot teach-through initialization based on the previously trained systems. Some embodiments may implement a pair of models, one initialized based convergence of values in previously trained systems (or even from a single previously trained system), and a second model, which trains out error from the initialized values. In either instance, teach times are expected to be reduced and yield to more rapid convergence of untrained model parameters to optimal values in a trained model of a robot learning to complete a task.

Some disclosed techniques may implement an approach incorporating a trained model of a trained robot, or a model including parameters based on parameters of trained models of a plurality of trained robots, like an intermediate robot-control model, and a second model which is trained on an untrained robot. Example operations may include initializing, with the computer system, an intermediate robot-control model of a second robot with parameters based on a trained robot control model, or a plurality of trained robot control models. The untrained robot-control model of the second robot may receive, as input, outputs of the intermediate robot-control model based on those initialized parameters. In turn, training of the second robot to perform the task or another task may include adjusting parameters of the second robot-control model based on performance of the intermediate robot-control model in performing the task or another task.

While some training is still expected, some embodiments are expected to reduce teach times of new or updated robots. Some embodiments are expected to be relatively sample-efficient, using orders of magnitude fewer on-robot data samples to learn how to accomplish a task. Thus, training time is expected to be reduced. Some embodiments are expected to accommodate similar, but subtly different, robots even when attempting to learn a same or similar task benefit from training specific to that robot. Some embodiments may not remove the training requirement altogether but such embodiments expected to greatly reduce training time for untrained robots to complete tasks, while still accommodating some out-of-sample cases that can otherwise cause errors. Further gains in sample efficiency are expected by initializing or otherwise basing parameter value selection based on convergence of (e.g., at least some) parameter values among a body of previous trained robot deployments, e.g., by implementing transfer learning from a plurality of trained instances of a model to a single untrained (which includes a trained model in need of re-training) instance of the model. Each respective model parameter may have a distribution of values among a fleet of trained robots, and some embodiments may use those distributions (e.g., population statistics) to determine parameters of an untrained model (which may have the same or different architecture and hyperparameters of the models from which transfer learning is applied). For example, parameters of a control model of an untrained robot for which values among prior trained robots have a higher degree of variation (e.g., converge within a wider range, or do not converge) may be learned more quickly by relatively constraining other parameters that converge within tighter ranges. Some embodiment may adjust a stride amount in a gradient descent optimization based on such measures of variation (e.g., applying larger stride where variation is higher in the distribution and vice versa) or adjust a temperature parameter in a simulated annealing optimization of the model to be trained (e.g., applying a higher temperature where variation is higher in the distribution and vice versa).

FIG. 1 shows an example computing environment 100 for expediting robot teach time through initialization based on previously trained robots. The computing environment 100 may include one or more robot systems 102, a user device 104, or a server 106. A robot system 102 may include a teaching subsystem 112 and a machine learning (ML) subsystem 114, or in some cases, one or both of these components may be hosted on server 106 (which may be a server system implemented with a plurality of servers providing various services corresponding to the functionality described herein). The ML subsystem 114 may include a machine learning model, like a robot control model 116. In many deployments, and especially those involving complex robotic systems, a robot control model 116 may refer to a specific machine learning (ML) model or a collection of ML models or components of a ML model. Some embodiments of a robot control model 116 may include multiple robot control models or even multiple robot control models that each include multiple constituent ML sub-models (which may be trained separately or concurrently through end-to-end training). The ML models may include an encoder model, a reinforcement learning model, a computer vision model, a geometric deep learning model, a dynamic model, an actor-critic model, a reward model, an anomaly detection model, or a variety of other machine learning models (e.g., any model described in connection with FIG. 2 or elsewhere herein).

In some examples, a robot control model (or models) may include a reinforcement learning model trained at least in part via a reinforcement learning process. For example, ML subsystem 314 may pipeline an encoder and a reinforcement learning model that are collectively trained with end-to-end learning, the encoder being operative to transform relatively high-dimensional outputs of a robot's sensor suite into lower-dimensional vector representations of each time slice which may be embedded (e.g., as a latent space embedding) within a latent embedding space, and the reinforcement learning model may be configured to update setpoints for robot actuators based on those vectors (e.g., based on their latent space embedding). Some embodiments may control robots with an even more expansive ensemble of such models, e.g., pipelining a convolutional neural network (or vision transformer) that extracts features from 2D image data, a geometric deep learning model that extracts features from 3D point clouds from depth sensors, and an encoder model that maps both sets of those features for a given time slice into respective vectors in latent embedding spaces, and a reinforcement learning model that controls the robot (e.g., outputs a time series of target setpoints of a plurality of actuators) based on a time-series of those vectors, each vector representing a time-slice or robot and environment state. Embodiments are not limited to only one ML model (or type) or a specific collection of ML models, which is not to suggest that any other description is limiting. Some embodiments are expected to expedite ML model training for other complex dynamic systems that benefit from system-specific training to reduce error. That said, various innovative techniques are described directed to various related ends, and embodiments are not limited to systems that afford these benefits, again which is not to suggest that any other description is limiting.

Figure 2:
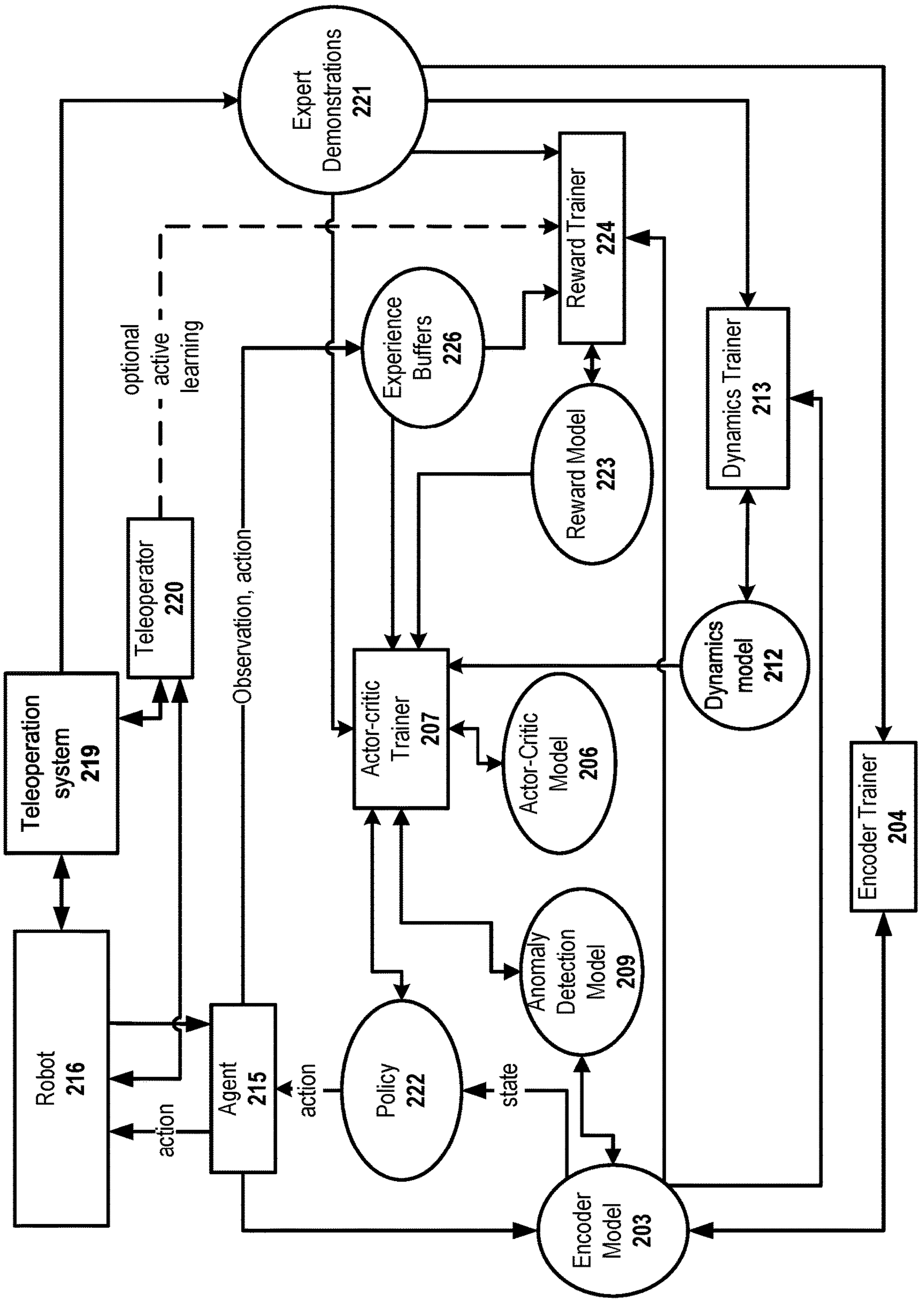
FIG. 2 is an example machine learning architecture and training environment of a robotic system upon which the present techniques may be implemented in accordance with some example embodiments.

FIG. 2 shows an example machine learning architecture and training environment 200 of a robotic system, in accordance with some example embodiments. Example functionality, components, or models shown in FIG. 2 may be implemented or supported by one or more entities within the environment 100 of FIG. 1. Different embodiments may distribute functionality or components among entities described herein in different ways, e.g., training or control may be both or individually remote or distributed relative to a fleet of robots, which may itself be distributed among various geolocations connected by communication networks.

The example environment 200, such as of a robot system, may include a robot 216. The robot 216 may include all or some of the components of an example robot system 102 as discussed with reference to FIG. 1. Examples of a robot 216 may include, but are not limited to: an anthropomorphic robot (e.g., with legs, arms, hands, or other parts), a non-anthropomorphic robot (but which may include one or more components to interact with objects (e.g., with suction, magnetism, pincers, electrically, etc.) or its environment (e.g., thrusters, jets, propellers, etc.) in humanlike or non-humanlike ways), an articulated robot (e.g., an arm having two, six, or ten degrees of freedom, etc.), a cartesian robot (e.g., rectilinear or gantry robots, robots having three prismatic joints, etc.), Selective Compliance Assembly Robot Arm (SCARA) robots (e.g., with a donut shaped work envelope, with two parallel joints that provide compliance in one selected plane, with rotary shafts positioned vertically, with an end effector attached to an arm, etc.), delta robots (e.g., parallel link robots with parallel joint linkages connected with a common base, having direct control of each joint over the end effector, which may be used for pick-and-place or product transfer applications, etc.), polar robots (e.g., with a twisting joint connecting the arm with the base and a combination of two rotary joints and one linear joint connecting the links, having a centrally pivoting shaft and an extendable rotating arm, spherical robots, etc.), cylindrical robots (e.g., with at least one rotary joint at the base and at least one prismatic joint connecting the links, with a pivoting shaft and extendable arm that moves vertically and by sliding, with a cylindrical configuration that offers vertical and horizontal linear movement along with rotary movement about the vertical axis, etc.), a self-driving car (or other vehicle, like a truck, a drone or boat), a household appliance, construction or manufacturing equipment, or a variety of other types of robots. The robot 216 may include the robot in, or one or more cameras, joints, servomotors, stepper motors, pneumatic actuators, or any other component discussed in, U.S. patent application Ser. No. 16/918,999, filed 1 Jul. 2020, titled "Artificial Intelligence-Actuated Robot," the entire contents of which are hereby incorporated by reference.

In some example embodiments, one or more of the components of the environment 200 may implement aspects of a reinforcement learning process, which may include deep reinforcement learning techniques, to control aspects of robot operations. In some examples, an agent 215 may send the robot 216 one or more actions determined based on a policy 222. The policy 222 may take, as input, a current state of the robot and return an action to perform (e.g., to cause the robot to transition from the current state to a next state). The action returned by (or based on) the policy 222 may maximize a reward, or rewards (e.g., cumulative), over time (e.g., such as to complete a task). In some cases, a reward for a given current action may be negative (or suboptimal) relative to other possible rewards for other actions but selected by the policy 222 to maximize cumulative rewards.

Results of an action performed by the robot 216 within its environment may cause changes in various sensor readings or otherwise yield sensor feedback data, which may be analyzed to determine a (new) current state by which another action for the robot may be determined based on policy 222. For example, an encoder model, which in some examples may be a trained encoder model 203, may generate a vector representation of the state of the robot and its environment based on data obtained from sensors of the robot 216. Sensor data, like feedback data, collected by the robot 216 may be passed via the agent 215 to the encoder model 203, such as in a feedback loop, by which the encoder model 203 may output (e.g., update) a current state of the robot (e.g., which may be continuously updated, such as at a given frequency, based on obtained sensor data). For example, the encoder model 203 may generate a (e.g., current) vector representation (e.g., a latent space embedding) based on obtained feedback data from the sensors that indicates the current state of the robot. Then, the encoder model 203 may obtain (e.g., updated) feedback data from the sensors (e.g., as a result of an action performed by the robot) and generate a (e.g., new) vector representation (e.g., a new latent space embedding) based on the updated feedback data from the sensors that indicates the new (e.g., now current) state of the robot. The policy 222 may then determine whether the new state of the robot corresponds to the next (e.g., desired) state (e.g., based on the vector representation) and whether to output another action based on the result. In some embodiments, an encoder model 203 may be trained via an encoder trainer 204 based on latent space embeddings (e.g., of vectors indicative of robot state) within a latent embedding space. A latent space embedding may reduce the dimensionality of data received from sensors, such as to facilitate efficient processing of robot state by other models. For example, if the robot has multiple color 1080p cameras, touch sensors, motor sensors, or a variety of other sensors, then input to an encoder model for a given state of the robot (e.g., output from the sensors for a given time slice) may be tens of millions of dimensions. The encoder model may reduce the sensor data to a vector in a latent space embedding (e.g., a space between 10 and 2000 dimensions in some embodiments). Distance between a first space embedding (e.g., which may correspond to an initial state) and a second space embedding (e.g., which may correspond to a current state) may preserve the relative dissimilarity between the state of a robot associated with the first space embedding and the state of a robot (which may be the same or a different robot) associated with the second space embedding.

In some embodiments, an anomaly detection model 209 may receive vector representations from an encoder (or encoder model) 203 and determine whether a received vector representation is anomalous or not (e.g., meets or exceeds anomalous classification criteria). Although only one encoder 203 is shown, embodiments may include multiple encoders or encoder models (e.g., for processing feedback data from different sensors or collections of sensors or other encoders). For example, a first encoder may send latent space embeddings to the anomaly detection model 209 and a second encoder may send latent space embeddings to the first encoder model or other components of the system 200.

In some embodiments, a dynamics model 212 may predict a next state given a current state and action that will be performed in the current state (e.g., to cause the robot to transition to the next state). The dynamics model 213 may be trained by the dynamics trainer 213 based on training data collected in association with input instructions during training demonstrations (e.g., inputs provided by a teleoperator, such as via a user device) or otherwise based on performance of the robot system at completing a task (e.g., during training or over the course of its operation). Predictions output by the dynamics model 212 may include a predicted trajectory from a current state (e.g., towards a next state) based on the current state and action to be performed by the robot. Many possible trajectories may exist from one state to another state, but some (or even most) may result in failure of a task (e.g., spilling the contents of a container). Thus, for example, a correct trajectory may account for coordinated actions of various components of the robot to reach a next state without failing a task, and among those correct trajectories, some may be more optimal than others. A trained dynamics model 212 may predict whether an action is indicative of a deviation from a correct (or optimal) trajectory. For example, the dynamics model 212 may determine whether an action corresponds to a predicted trajectory having one or more parameters that exceed (e.g., turning too fast, lifting a container without maintaining its orientation relative to gravity, moving one component but not another, and spilling the contents) or otherwise deviate from parameter values of a correct (or optimal) trajectory that yield to a successful transition between states (e.g., based on classification of successful and unsuccessful transitions included in training data processed by the dynamics trainer 213 to train the dynamics model 212).

In some embodiments, an actor-critic model 206 may determine actions for a robot 216 to perform based on policy 222. An example of an actor-critic model 206 may be implemented as a (or component of a) reinforcement learning model. An actor-critic trainer 207 may train the actor-critic model 206 based on training data collected in association with performed actions, changes in state resulting from the actions, or rewards associated with states or changes in states, among other data (e.g., whether an action corresponded to movement along a correct (or optimal) trajectory). The actor-critic model 206 may adjust the policy 222 to indicate what actions are permitted or are to be performed given certain criteria (e.g., an input state and a desired next state, associated rewards, among other data, such as whether a container is empty or full).

In some embodiments, a reward model 223 may take as input a state of the robot 216 (e.g., the state may be generated by the encoder model 203) (and optionally other input indicative of how the robot 216 reached the state) and output a reward. For example, the reward model 223 may output a reward to the robot 216 (e.g., via indication of a reward to one or more other components) for reaching a state corresponding to completion of a task or one or more states corresponding to progress towards completing a task. The output from the reward model 223 may be received by the various trainers (or the models) to classify whether one or more determinations produced a reward, whether the reward was positive or negative, or magnitude associated with the reward. For example, rewards received by the actor-critic trainer 207 and actor-critic model 206 may improve ability of the model 206 to determine whether an action or sequence of actions lead to (or will lead to) the completion of a task assigned to the robot 216 to maximize reward. The reward trainer 224 may train the reward model 223 based on indications of success (or failure) received via a teleoperation system 219 or via sampling of data stored in the experience buffers 226 (e.g., to determine an indication of success or failure based on internal or external feedback or other criteria, such as detection of whether a container was dropped based on sensor feedback data, or external feedback indicating whether a weight of container remained within a threshold between two weigh stations to indicate whether contents were lost or new contents the robot 216 was intended to receive into the container were not collected). In some embodiments, the system 200 may adjust a weight or bias of the reinforcement learning model, such as a deep reinforcement learning model, in response to determining that a latent space embedding (e.g., generated by the encoder model 203) corresponds to a desired or undesired state. In turn, other models of the system may receive rewards corresponding to their performance of reaching desired states and avoiding undesired states by their actions that cause the robot to transition between states to accomplish a task (and those models too may update their weights or biases based on their performance as indicated by received rewards). Thus, adjusting a weight of the reinforcement model may reduce a likelihood of the robot of performing an action that leads to an anomalous state.

In some embodiments, an experience buffer 226 may store data corresponding to operations of the robot 216. For example, one or more experience buffers 226 may store data such as current state information, an action determined based on the current state, feedback data collected in association with performing the action, resulting state information, or other observational or external feedback data during operation of the robot. Data stored within an experience buffer 226 may include data generated based on training instructions, like commands instructing the robot to perform one or more actions. For example, a teleoperation system 219 may be used by a teleoperator 220 to provide instructions (e.g., via a user device) to control the robot 216. In some embodiments, a teleoperation system 219 may record demonstrations of the robot performing a task (e.g., based on operator input controls), which may be associated with or included in data stored within an experience buffer 226. Stored data may include sequences of observations, like sensor feedback data, generated via the robot 216 (e.g., cameras, touch sensors, sensors in servomechanisms, or other parts of the robot 216 among other feedback) during a demonstration, and an indication of whether the given demonstration was successful (or not, or other result). Data stored within the experience buffers 226 (or by other components of the system 200) may be associated with received or determined indications of success or failure at a task or progress towards completing a task to generate training data (or sets of training data, like a training set and a validation set) for machine learning models.

A machine learning model may be trained (e.g., iteratively, by adjusting values, like weights, of a parameter set of the machine learning model) based on training data to determine values of model parameters that maximize indications of successes (e.g., rewards) and minimize indications of failure in model outputs that are generated based on inputs to the model and values of model parameters. In some examples, one or more models, like the above-described models, may be trained based on training data including outputs generated by other models, sensor feedback data or other feedback, and classifications (e.g., indications of success or failure), at least some of which may be stored within one or more experience buffers 226 and may include, or later be augmented with other data or classifications (e.g., based on analysis of stored or merging of external feedback or indications of success or failure). For example, the data may be used to determine rewards (e.g., for operations that correspond to indications of success) and train the reward model 223.

Additionally, or alternatively, the data stored by the experience buffers 226 may be used by the actor-critic trainer to train the actor-critic model 206 to determine actions for the robot 216 to perform. Some models may be trained based on the outputs of other models. For example, the actor-critic model 206 and the encoder model 203 may be trained based on outputs generated by each other or other models. For example, a trainer may adjust a given weight of the encoder model 203 based on an action determined by a reinforcement learning model (e.g., the actor-critic model 206).

Additionally, or alternatively, a trainer (which may be a different trainer, or the same) may adjust a given weight or bias of a reinforcement learning model (e.g., like an actor-critic model 206), such as a deep reinforcement learning model, based on the state (e.g., a latent space embedding) generated via the encoder model 203 based on the feedback data received from sensors of the robot. In another example, a trainer may adjust a weight of the reinforcement learning model (e.g., the actor-critic model 206) in response to determining that a latent space embedding (e.g., generated by the encoder model 203) corresponds to an anomaly (e.g., failure state or other undesirable condition). An example trainer may determine an adjustment to a weight of the reinforcement model that, e.g., is predicted, or determined based on trial and error or other feedback data, to reduce a likelihood of model outputs to cause the robot to perform an action that leads to that anomalous state (among others). Example machine learning models may be trained by a ML subsystem (e.g., which may include one or more trainers) of a robot or a server or both.

Figure 3:
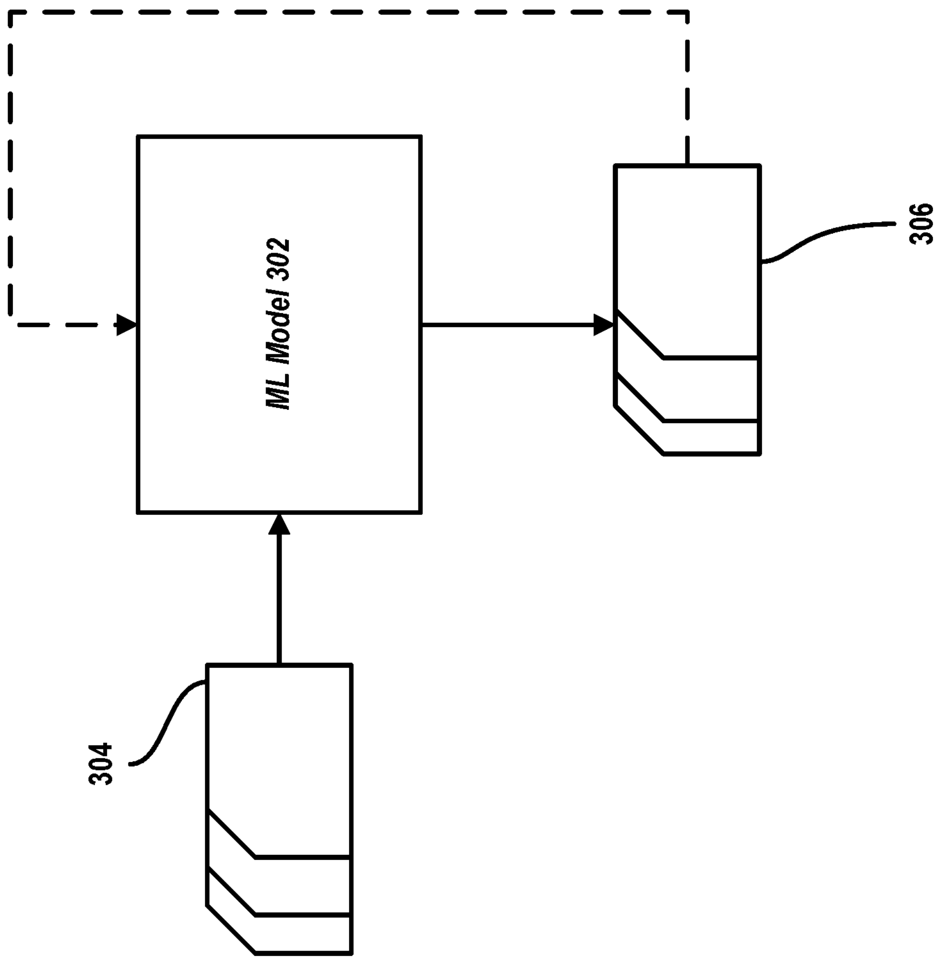
FIG. 3 is an example machine learning model in accordance with some embodiments.

As an example, described with respect to FIG. 3, a machine learning model 302 may take one or more inputs and generate one or more outputs. Examples of a machine learning model 302 may include a neural network or other machine learning model described herein, may take inputs 304 (e.g., input data that described above) and provide outputs 306 (e.g., output data like that described above) based on the inputs and parameter values of the model. For example, the model 302 may be fed an input or set of inputs 304 for processing based on a state, sensor data, action, instructions for an action, or other data, and provide an output or set of outputs 306. In some cases, outputs 306 may be fed back to machine learning model 302 as input to train machine learning model 302 (e.g., alone or in conjunction with indications of the performance of outputs 306, thresholds associated with the inputs, or with other feedback information). In another use case, machine learning model 302 may update its configurations (e.g., weights, biases, or other parameters) based on its assessment of a prediction or instructions (e.g., outputs 306) against feedback information (e.g., sensor data, state labels, like anomalous, indications of the performance or with other feedback information). In another use case, such as where machine learning model 302 is a neural network, connection weights may be adjusted to reconcile differences between the neural network's prediction or instructions and the feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions or instructions.

In some embodiments, the machine learning model 302 may include an artificial neural network. In such embodiments, machine learning model 302 may include an input layer and one or more hidden layers. Each neural unit of the machine learning model may be connected with one or more other neural units of the machine learning model 302. Such connections can be enforcing or inhibitory in their effect on the activation state of connected neural units. Each individual neural unit may have a summation function which combines the values of one or more of its inputs together. Each connection (or the neural unit itself) may have a threshold function that a signal must surpass before it propagates to other neural units. The machine learning model 302 may be self-learning or trained, rather than explicitly programmed, and may perform significantly better in certain areas of problem solving, as compared to computer programs that do not use machine learning. During training, an output layer of the machine learning model 302 may correspond to a classification, and an input known to correspond to that classification may be input into an input layer of machine learning model during training. During testing, an input without a known classification may be input into the input layer, and a determined classification may be output. In some examples, a classification may be an indication of whether an action is predicted to cause a robot to transition from a current state to a target state along a desired trajectory. Some example machine learning models may include one or more embedding layers at which information or data (e.g., any data or information discussed herein in connection with example models) is converted into one or more vector representations. The one or more vector representations of the message may be pooled at one or more subsequent layers to convert the one or more vector representations into a single vector representation.

In some embodiments, a machine learning model 302 may be structured as a factorization machine model. A machine learning model 302 may be a non-linear model or supervised learning model that can perform classification or regression. For example, the machine learning model 302 may be a general-purpose supervised learning algorithm that a system uses for both classification and regression tasks. Alternatively, the machine learning model 302 may include a Bayesian model configured to perform variational inference (e.g., deviation from a trajectory). A machine learning model 302 may be implemented as a decision tree or as an ensemble model (e.g., using random forest, bagging, adaptive booster, gradient boost, XGBoost, etc.).

In some embodiments, a machine learning model 302 implements deep reinforcement learning via one or more neural networks, one or more of which may be a recurrent neural network. Reinforcement learning is often modeled for low dimensionality data via a Markov decision process where a policy, like a mapping of states and actions that maximizes rewards, is determined through sampling. Many example use cases for reinforcement learning, however, such as those described herein, involve a data stream with high dimensionality. For example, if a robot has multiple color 1080p cameras, multiple touch sensing arrays (e.g., 10 or more), multiple strain sensors (e.g., 20 or 100 or more, such as for a plurality of linkages), a data stream by which state is inferred may include millions, tens of millions, or even more than 100 million dimensions. In some examples, a neural network, which may be implement an encoder, may reduce dimensionality of the state space (e.g., to a latent state space). For example, an encoder may determine a vector based on high dimensionality sensor data which can then be embedded in a latent embedding space having reduced dimensionality, such as a space having between 10 and 2000 dimensions in some embodiments (e.g., instead of tens or hundreds of thousands or a million or more dimensions).

In some embodiments, contrastive learning approaches are implemented to minimize distance (e.g., maximize closeness) of similar features within the latent space. For example, an encoder may generate a latent space embedding (e.g., a vector representation with reduced dimensionality relative to a vector including the totality of obtained feedback data for a time slice) based on sensor or other feedback data that indicates the state of the robot or the environment around the robot periodically (e.g., 30 times per second, 10 times per second, every two seconds, etc.). A latent space embedding may indicate a current position or state of the robot (e.g., the state of the robot after performing an action to turn a door handle). As noted above, a latent space embedding may reduce the dimensionality of data received from sensors. For example, if the robot has multiple color 1080p cameras, touch sensors, motor sensors, or a variety of other sensors, then input to an encoder model for a given state of the robot (e.g., output from the sensors for a given time slice) may be tens of millions of dimensions. The encoder model may reduce the sensor data (e.g., having potentially many orders of magnitude more dimensions than 2000) to a latent space embedding in a latent embedding space to facilitate training on a reduced number of factors (e.g., like a filter).

Latent space embeddings within the latent embedding space may be classified in connection with a reinforcement learning process. For example, training of a machine learning model 302 may include the generation of a plurality of latent space embeddings as, or in connection with, outputs 306 of the model which may be classified (e.g., during one or more trial and error processes). The different latent space embeddings and their classification may correspond to states, like those in a Markov decision process. Different ones of the models discussed herein may determine or perform actions based on current, predicted, and known latent space embeddings, such as to take an action determined to maximize reward (e.g., which may be immediate or over time) by transition to a next (e.g., desired, or at least not an undesired or anomalous) state in accordance with sensor feedback corresponding to the robot and its environment. The model may attempt to learn a policy, which in some cases may include a mapping of latent space embeddings based on obtained feedback data to actions performed (e.g., how model outputs caused the robot to transition from one state to another), by which the model may determine an output predicted to transition to a next state that maximizes a reward (which in some cases may be sum of rewards).

Some embodiments may reduce dimensionality of high-dimensional data (e.g., with one million or more dimensions) before it is provided to the reinforcement learning model, such as by forming latent space embedding vectors (e.g., with 100,000 or fewer dimensions) based on high dimension data as described in various embodiments herein to reduce processing complexity to a degree that supports near real-time (e.g., multiple times per second, such as 10, 20 or 30 or more) sequences of state determination to control model outputs that control robot actuators. In some embodiments, the high-dimensional data may be reduced by one or more encoder models (which each may implement a neural network) that process sensor data. In some cases, features may be extracted from sensor data (e.g., with a convolutional neural network or vision transformer for 2D image data, a transformer model or long-short term memory model for time-series data like motor current, or a geometric deep learning model for 3D point clouds from depth sensors). The extracted features may be input to an encoder model, like a time contrastive network, which may output a vector as a latent space embedding. Or in some embodiments, high-dimensional data such as images from a camera or the raw sensor stream from the robot may be directly processed with deep reinforcement learning algorithms that represent learned actions or functions or policy objectives as a neural network.

Examples of machine learning model may include multiple models. For example, a clustering model may cluster latent space embeddings represented in training (or output) data. In some cases, classification of latent space embeddings within a cluster may indicate information about the state. For example, a clustering model (e.g., K-means, DBSCAN (density-based spatial clustering of applications with noise), or a variety of other unsupervised machine learning models used for clustering) may take as input a latent space embedding and determine whether it belongs (e.g., based on a threshold distance) to one or more other clusters of other space embeddings that have been previously trained. In some cases, nearest clusters may also be identified, such as for determining how close the input latent space embedding is to reaching a cluster (e.g., which may correspond to a desired state of the robot based on classification of the cluster). Classifications associated with the latent space embeddings within a cluster may be indicative of a classification for the cluster, to which the input latent space embedding may be determined to belong, such as to indicate information about state associated with the input latent space embedding. Thus, latent space embeddings in at least some of the respective clusters may include latent space embeddings corresponding to states to complete a task that an instance of the robot has been trained to complete. Some other regions of the latent space may be indicated as anomalous (or unknown), in some cases may include latent space embeddings classified as anomalous (or clusters thereof), or otherwise indicate whether an input latent space embedding corresponds to an undesired state. In traditional approaches, operations like those above may be applied to each instance of a robot, or instance of a model of a robot, and may be re-applied (in many cases from a clean slate as in the case of a new robot instance) when parts or functionality of an instance of a robot are altered or replaced.

FIG. 1 depicts multiple robot systems as part of the computing environment 100. While multiple robot systems are shown, techniques may be applied to a single robot system, such as where the robot system is updated, or components are otherwise replaced, which may involve retraining of the robot system to perform a task with below a threshold amount of error. Additionally, while shown as distinct objects, functionality described below in connection with a given robot system 102, the server 106, or the user device 104 may be performed by any one device. Each of the robot system 102, the server 106, or the user device 104 may be implemented as one system or as separate systems. A given robot system 102 (which may be an individual robot), server 106, or user device 104 may communicate with each other via the network 150. In some examples, two or more robot systems 102 may communicate with each other via the network 150 or another network or wired or wireless communication link between the robots. While example communication links are shown between each robot and the network 150, these communication links need not be persistent nor exist simultaneously within the context of the disclosure (which is not to suggest that communication links cannot exist simultaneously).

A control model 116 of a robot system may be trained to effectuate operations of the robot system to perform a task. Completion of a task by a robot system may include the performance of a sequence of actions by the robot, like a trajectory, to transition between a starting point to an ending point corresponding to the completion of the task, or completion may be marked by some change in state of the environment of the robot. As the robot performs a sequence of actions, sensor data may produce a sequence of vector representations (e.g., latent space embeddings) indicating how the robot and its environment are responding to commands. Thus, for example, a trajectory may produce a sequence of latent space embeddings that indicate how the robot and its environment have evolved over time.

A control model 116 may be trained on a set of sequences of embedding vectors (among other data). Each member of the set of embedding vectors may correspond to an instance in which a robot previously performed a task. For example, each member may correspond to an instance where a robot changed a tire on a vehicle or performed some other instance of some other task. Each embedding vector may encode a plurality of channels of sensor data of an instance of the robot in a latent embedding space during a time slice (e.g., a duration of time less than 1 second, 500 ms, 100 ms, 50 ms, or shorter) during the instance of the task. For example, the sensor data may include images (e.g., including video) taken from cameras located on the robot or around the robot (e.g., with the robot or a workpiece in a field of view of the cameras). Each sequence of the set of sequences may have embedding vectors corresponding to different states of the robot and the environment while completing the task.

Beginning a task, such as in the case of a robot receiving a wheel with a tire to mount on the wheel (or some other task), the robot may collect input data from the plurality of channels of sensor data. An encoder may be configured to transform the input into an embedding vector in the latent embedding space and may provide the resulting embedding vector as feedback data to the control model. The control model, based on the feedback data and the desired trajectory, may be configured to control the robot in response to the resulting vector. For example, an embedding vector may indicate that an end effector is off by 1 centimeter in a given direction from a target pose in a trajectory. In response, the control model may instruct an actuator to correct the difference. The robot may collect new input data from the plurality of channels of sensor data, a new embedding vector may be encoded, new feedback data processed, and further movement along the trajectory completed until completion of the task.

In order to perform tasks, like in the above example, a robotic system 102 may include a combination of members, joints, actuators, and tendons configured to grasp an object, like one or more arms (e.g., appendages). Joints may couple and permit movement of coupled members with varying degrees of freedom and tendons (e.g., like wire, chain, etc.) in combination with actuators may effectuate movement of one or more of those members. Various sensors, such as tactile or force sensors or strain sensors or pressure sensors, along with cameras, inertial measurement units, and the like may output sensor data corresponding to movements and interactions of components of the arm with itself or other objects. Sensor data may be collected from various image or distance sensors, which may be processed to determine position of the arm (or members thereof) within the environment and other environmental data. For example, as the robot moves towards an object, sensor data including images showing the environment around the robot, data indicating positions of legs and arms of the robot, etc. may be collected.

Sensor data may be obtained while an action or a portion of an action is performed or after an action is performed. Obtained sensor data may be collected periodically (e.g., in a relatively continuous fashion), such as thirty times per second, 120 times per second, or more, etc., and encoded for processing. Some examples of sensor data may include an associated data value to indicate whether a value was increasing or decreasing or steady within a given collection period (e.g., some lower-level components may read and pre-process sensor data with a higher frequency than that it is reported for encoding, or the encoder may implement such functionality for sensors streaming data at a higher frequency). Sensor data may include images taken by one or more cameras of the robot. Sensor data may include position data from servo motors or stepper motors indicating the positions of one or more part of the robot, the positions of one or more parts of the robot relative to other parts of the robot, battery level, power consumption, motor current, or a variety of other information associated with state of the robot. The sensor data may include information obtained from a motor position sensor of the robot (e.g., located in arm, member, joint, or other part of the robot system 102), a touch sensor located in a part of the robot system 102 (e.g., a finger of the robot system 102), or a motor current sensor of the robot.

Some embodiments of a robot system 102 including a plurality of sensors may be of a modular system hardware design such that each sensor (or a grouping of sensors) is coupled directly with special-purpose chipsets for performing a space (e.g., like a sub-space) encoding of sensor data prior to downstream digestion by a higher-level component or model (e.g., like an encoder) of the system for determining a state of the robot. The special-purpose chipsets can take a variety of forms, including, but not limited to, Movidius chips, tensorflow edge compute devices, Nvidia Drive PX and Jetson TX1/TX2 Module, Intel Nervana processors, Mobileye EyeQ processors, Habana processors, Qualcomm's Cloud AI100 processors and SoC AI engines, IBM's TrueNorth processors, NXP's S32V234 and S32 chips, AWS Inferentia chips, Microsoft Brainwaive chips, Apple's Neural Engine, ARM's Project Trillium based processors, Cerebras's processors, Graphcore processors, PEZY Computing processors, Tenstorrent processors, Blaize processors, Adapteva processors, Mythic processors, Kalray's Massively Parallel Processor Array, BrainChip's spiking neural network processors, Almotiv's neural network acceleration core, Hailo-8 processors, and various neural network processing units from other vendors.

As noted above, the sensor data of the robot may be processed to generate latent space embeddings. For example, an encoder may generate a latent space embedding (e.g., a vector representation) indicative of a state of the robot or the environment around the robot periodically (e.g., 30 times per second, 10 times per second, every two seconds, etc.). Thus, a latent space embedding may indicate a current position or state of the robot during the course of a task. Similarity scores based on a distance metric (e.g., Euclidian distance, Minkowski distance, cosine distance, Hamming distance, or a variety of other distance metrics) may be used to determine distances between latent space embeddings within the latent embedding space. Thus, for example, a distance between states, like between a predicted state and a desired state, or current state and a predicted state or desired state may be determined. Likewise, a distance between a predicted state or current state and one or more anomalous states may be determined, such as to indicate whether the robot is in (or is close to in), or an action of the robot may yield to (or is approaching), an anomalous state. One or more different thresholds for similarity scores may indicate whether a given latent space embedding corresponds to a desired or undesired robot state, such as indicated by records of states and their respective classification within the latent embedding space.

Training of the robot system 102 may include both simulated performance of a task and capturing training examples by having a human control the robot (e.g., entirely) through performance of instances of a task. For example, a robot system may include a teaching subsystem 112 by which an operator (e.g., remotely) may input instructions to effectuate movement of the robot, such as to guide movements of the robot to complete a task. For a successful iteration of completing the task or a portion thereof, a sequence of latent space embeddings and corresponding operator commands may be captured and labeled collectively as corresponding to a successful instance of performing the task. Conversely, for an unsuccessful iteration (e.g., the robot failed to complete at least a portion of a task), a sequence of latent space embeddings and corresponding operator commands may be captured and labeled as corresponded to a negative result. For example, the machine learning subsystem 114 may receive training data corresponding to a task based on the performance of the robot. While the above example uses a teaching subsystem 112 and operator inputs, a control model 116 may also determine and issue instructions (e.g., as described herein based on feedback data and current model parameters) to effectuate movement of the robot to complete a task. Various stop conditions, which may be indicated within the latent embedding space or actuator command space (e.g., to prevent damage to the robot), or other feedback signals, may automatically, or based on operator input, indicate whether the robot failed at completing the task. Feedback signals may also automatically, or based on operator input, indicate that the robot completed the task. Thus, some embodiments generate training data received by the machine learning subsystem 114.

The machine learning subsystem 114 may store generated training data, which may be used by the machine learning subsystem or other system to train a control model 116 of the robot. In some cases, the machine learning subsystem 114 may store the training data, which may be offloaded to a server (e.g., 106) for processing to train a control model which may be uploaded to the robot system 102.

In some examples, a server 106 or a machine learning subsystem 114 may train a robot control model 116 A specific to a robot system 102 A based on training data generated from multiple instances of the robot system 102 A performing (or attempting to perform) a task. As the training process may include multiple iterations of operator control inputs via the teaching subsystem 112 to guide the robot to complete a task or multiple iterations of supervised training of the robot attempting to complete the task to generate training data, or both, the control model 116 A may be iteratively trained based on newly generated training data (e.g., until attempts by the robot to complete the task reach a threshold ratio of success or efficiency, which is not to suggest that the control model 116 A may not still be periodically updated to increase performance, but rather illustrate a threshed at which the control model 116 A and thus the robot system 102 A may be considered trained to perform the task to a standard or within certain criteria compared an untrained counterpart).

Training a robot system 102 A, such as in accordance with the above-described training process, is expected to account for idiosyncratic properties of individual instances of tactile sensors, joints, members (e.g., dexterous or otherwise), tendons, image sensors, actuators or motors, or other equipment of the robot system 102 A based on the collected feedback data. Additionally, such training is expected to account for environmental factors within which the robot system 102 A operates to perform a task. A trained control model 116 A of the robot system 102 A thus may account for (e.g., learn to accommodate) properties of the robot system 102 A for which it generates instructions to perform robot control actions based on robot state, such as to cause the robot to complete a task. The teach time (e.g., duration of the training process, which includes generating the training data) to develop the trained control model 116 A, however, may consume a considerable amount of time. A lengthy teach time is typically overlooked for a simple task, replicated many times, with little variation. However, expected use cases of a robot system 102 may include deployment of a multitude of robots (e.g., three, tens, hundreds or thousands or more), in variable settings, with relatively frequent changes in tasks, making a need for excessively large training set sizes problematic.

Environment 100 of FIG. 1 depicts a number of robot systems 102 (e.g., 3 or more) and contemplates use cases involving deployments of tens, hundreds, if not thousands or more robot systems. Example robot systems 102 may be incredibly complex, with hundreds or thousands of parts, many of which may be precisely controlled based on instructions determined by a control model of a robot system. Small differences or variances in those parts can yield to differences in control models between different robot systems 102. Additionally, example robot systems 102 may operate in different environments which may present varying challenges to robot system operation, whether due to impact on components, sensor readings, or variation in tasks.

Robot system 102 A and robot system 102 B (among other robot systems up to 102 *n* robot systems), even when featuring similar (or what many would consider the same) parts or construction, may vary physically. For example, robot system 102 A and robot system 102 B may exhibit physical variances due to produced component tolerances, wear or frictional differences that evolve over time in a given robot, resistance (e.g., in signaling paths, components, or between components), etc., or installed orientation which may further result in tolerance stacking (or canceling) between different components, or which may otherwise result from different operating environments (e.g., battery capacity, response of dexterous members, interference affecting signal paths or sensor readings, or other components due to temperature or humidity or radiation or magnetic fields among other factors). These variances may produce differences in raw feedback data for a same input or same raw feedback data for different inputs between robots even though two robot systems 102 (or a collection thereof) are relatively similar. Thus the same robot may have different dynamics over time, and different instances of the same robot may have different dynamics.

Different ones of the robot systems 102 may operate within different environments. For example, a robot system 102 A may perform a task in different lighting conditions than robot system 102 B. Environmental variances such as lighting conditions, radiation, magnetism, temperature, or humidity, may yield differences in raw feedback data. Other environmental factors may also affect how robot systems 102 in different environments complete a same or similar task. For example, robot system 102 A may encounter doors with round doorknobs and robot system 102 B may encounter doors with levers, or robot system 102 A may operate in a room with bright lighting and minimal visual background clutter (e.g., reducing background interference within image data) and robot system 102 B may operate in a room with dim lighting and a relatively high degree of visual background clutter (e.g., increasing background interference within image data). Such example differences in environmental factors may increase difficulty of processes to accurately perform classifications (e.g., with less than a threshold amount of error) or perform classifications within a threshold amount of time under given conditions (e.g., resolve an object for collision avoidance at different velocities of movement).

Further, different robot systems 102 may be upgraded or refreshed (e.g., with new, updated, or replacement parts) at different times based on different maintenance schedules due to uptime or environmental factors. In some cases, updating a sensor or other component of a robot system 102 may yield differences like those described above between a prior version of a control model and an updated control model (e.g., after some re-training) that accounts for changes in raw feedback data.

The above and other differences between robot systems 102 and the environments the respective robot systems operate in are typically addressed solely by robot-specific training of a control model for the robot system within the environment which the robot system operates. As a result, a control model 116A of a robot system 102A may include numerous parametric differences from a control model 116B of another robot system 102B after training of each robot (e.g., to reduce their error in performing the same or different tasks). Robot-specific training of a control model of a robot system from an initial state, while accounting for robot system and operational environment differences, can result in lengthy robot teach times.

To reduce teach times, parameters of a trained control model (e.g., 116 B) and, optionally (which is not to suggest that other features are not also optional), parameters of a plurality of trained control models of respective robot systems (e.g., 102B to 102*n*) may be leveraged to expedite training of a new robot system 112A with various forms of transfer learning described herein. A subset (or all) of the trained robotic systems (e.g., 102B to 102*n*) may perform a same or similar task (or tasks), different ones or subsets of the robotic systems may perform different tasks, and different ones or subsets of the robotic systems may perform some similar tasks and some different tasks. One or more of the trained robotic systems (e.g., 102B to 102*n*) may be trained to perform a same or similar task to that which the new robot system 112 A is desired to perform, optionally within a same or similar environment within which the new robot system 112A is desired to operation. However, no requirement exists for a trained robot system (e.g., 102B to 102*n*) to already be capable of performing a task that the new robot system 112A is desired to perform, or to operate within a same or similar environment within which the new robot system is desired to operate to perform the task.

In some cases, transfer learning may be implemented between a single pair of robots, or for a single robot across tasks or environments. Or some embodiments may apply transfer learning techniques that leverage trained models across a larger fleet of robots. There may be multiple robot systems 102 (e.g., tens, hundreds, thousands, or more in a fleet) that perform tasks and send data (e.g., like their trained models or data like that in the training sets above, including data from fully automated performance of tasks without human intervention) to a server 106. For example, a machine learning (ML) subsystem 114 of a robot may store collected data (which may include training data) and send some or all of the collected data to the server 106, such as for iterative training processes or to otherwise report on operation of the robot. The data transmitted to the server 106 may include control model data, such as parameters of a robot system, or one or more control models themselves. For example, in some example embodiments, the data sent to the server 106 by the ML subsystem 114 of a robot may include values of parameters of a control model of the robot, or differences in values of parameters between iterations or versions of the control model of the robot (e.g., in examples where one or more control models are updated by the robot system). In some example embodiments, the data sent to the server 106 by the ML subsystem 114 of a robot may include data (e.g., training data) by which the server 106 may train or update the control model of the robot, and the server may store (e.g., in addition to providing an updated control models to a robot) determined values of parameters of the control model of the robot, or differences in values of parameters between iterations or versions of the control model of the robot. Different ones of the robot systems (e.g., depending on their role or current efficiency in performing a task) may report data to the server 106 in different ways, such as periodically (e.g., after training) or streaming (e.g., during training or which pertains to operation), or stream some subset of data and periodically report another subset of data.

Some examples of the environment 100 may include a prediction database 132, like that illustrated, which may store data about (e.g., trained or new) robots and predictions for expediting training of new robots. For example, the prediction database 132 may include one or more model databases 136 that store data about one or more robots and their respective control models (e.g., one or more iterations thereof, like architectures, hyperparameters, and model parameters adjusted through training), operational environment, task (or tasks), or other data. In some embodiments, the model databases 136 may store parameter values (e.g., values of weights, biases, etc.) of control models 116 of robot systems 102. For example, the model database 136 may include a record (or a number thereof) corresponding to robot system 102 B, which may contain parameters of the control models 116B among other data corresponding to robot system 102 B (e.g., like operation environment and other data like that described above). A record corresponding to robot system 102B may contain parameters for a plurality of models, such as in examples where a control model 116B includes a plurality of constituent models or a plurality of control models 116B operate in connection with each other to control the robot system, or other combinations. A record corresponding to robot system 102B may also contain parameters for a plurality of versions or iterations of a model, such as for different iterations of a control model 116B (e.g., obtained over time as the control model is iteratively trained) of the robot system 102B. The model database 136 may store a plurality of records containing data like that described above for a plurality of robot systems (e.g., 102B through 102*n*).

Embodiments of the prediction database 132 may include a parameter data database 134. The parameter data database 134 may store results or determinations based on data stored within the model databases 136. For example, the parameter data database 134 may store results of an analysis of robot control model data and store a determination based on the results of the analysis. In some examples, the parameter data database 134 may store one or more predictions, which may be based on one or more of the data stored within the model databases 136, results within the parameter data database 134, determinations within the parameter data database 134, and information about a new robot system.

In some embodiments, the server 106 may store and operate on data, like that described above, within the prediction databases 132. For example, the server 106 may receive data from robot systems, store the data, and perform one or more operations on the data. The server 106 may store results or other data based on those operations within the predication databases 132. For example, the server 106 may execute one or more of the processes by which some embodiments expedite robot teach through initialization based on previously trained robots.

In some embodiments, the server 106 may analyze parametric differences (e.g., differences in values taken by various corresponding parameters, like a given weight or bias) between control models to determine (e.g., predict) parameter values of a control model for another robot or to tune hyperparameters used when adjusting those parameters in the model to be trained. The parametric differences may correspond to differences between control models of different robot systems (e.g., 102B through 102*n*), but which may be of a same or similar construction. In some examples, the parametric differences may correspond to differences between iterations or versions of control models of a same robot system (e.g., 102B). Embodiments of the server 106 may perform one or both of the above analyses, among other analyses described herein, to determine information about parameter values (e.g., weights, biases, neural network, etc.) and hyperparameter values of robot control models.

The server 106 may analyze parametric differences between control models of different robot systems within their respective environments to identify one or more segments of a parameter set of control models of robotic systems trained to perform one or more tasks. For example, the analysis may identify a segment (e.g., like a subset) of parameters that remains the same, or relatively stable, between the control models of the different robot systems. For example, a relatively stable parameter may have a value (or values) that exhibit variation of less than a threshold amount across a plurality of robot systems. Another identified segment of a parameter set may exhibit variation of more than a threshold amount across a plurality of robot systems. In some embodiments, a single robot system may (e.g., initially) provide a basis for the analysis. For example, values of a parameter set of a control model of a robot system may be sampled or stored between training to perform different tasks, or between training iterations for a same task, and may be utilized to bootstrap a collection of parametric differences of control models (e.g., based on changes between versions or iterations of the control model of the robot system). In some examples, an analysis of parametric differences of control models resulting from training of a robot system to perform different tasks may indicate segments of a parameter set that remains the same, or relatively stable, or differ more than a threshold amount between the control models of a same robot system. In some examples, an analysis of parametric differences of control models across training iterations of a control model of a robot system may indicate segments of a parameter set which converge more quickly on their trained values. Some examples of the analysis may process parametric differences that may occur between trained control models of a single robot system, as described above, for a plurality of other robot systems for which those parametric differences are also tracked (e.g., during the training, over time, etc. for each robot system), which may indicate trends in parametric differences between tasks or which parameters converge more quickly across a collection of robot systems.

In some examples, the server 106 may form one or more predictions based on information stored within the predication databases 132. For example, the server 106 may analyze one or more records of models stored within the model database 136 to make various inferences about the parameters of those models and store the results in the parameter data database 134. For example, the server 106 may obtain records of a plurality of models. In some cases, the server 106 may select one or more records corresponding to a given type of model or even a specific model within the context of the ML subsystem 114 of example robot systems 102 described herein. For example, the server 106 may select records corresponding to encoder models, or anomaly detection models, among others described herein (e.g., with reference to FIG. 2 or elsewhere).

In some cases, such as where various models of same or different types are pipelined, the server 106 may select a subset of record corresponding to the sub-model type. For example, the server 106 may select records corresponding to a plurality of encoder models at a given location within a pipeline (which in some cases may have multiple branches, like of a tree, and selection of record may correspond to a given branch and depth in the pipeline of the branch). In some examples, a subset of records corresponding to instances of encoder models that processes sensor data for a first arm may be selected from records of encoder models, such as in use cases where other instances of encoder models process sensor data for a different arm, or sensor data for a torso of the robot, or instances of encoder models that process outputs of those models at a different stage in the pipeline. Records for other types of models may also be selected with some degree of specificity, such as to select records corresponding to instances of anomaly detection models.

The plurality of instances of models represented in a set of records selected by the server 106 for analysis may thus have at least some commonality, such be of a shared type (e.g., a recurrent neural network (RNN) or other neural network) and trained (e.g., may be in different stages of training but have at least some training) to perform a similar type of task, such as controlling a robot or one or more aspects of a process for controlling a robot (e.g., generate a latent space embedding, determine an action, predict a trajectory of an action, detect an anomalous state, output rewards for reinforcement learning, etc.). Additionally, the robot system 102 (or systems) to which the plurality of instances models represented in the set of record selected by the server 106 for analysis may also share a relative degree of commonality either in whole or at least with respect to the subsystem within which the model instances operate. For example, records of instances of encoder models that process sensor data for an arm (or given arm) of different robot systems may be selected provided the arms are of similar configuration even where other aspects of the robot systems differ.

In some cases, the selected set of records may correspond to models of relatively low-level hardware accelerators (e.g., on sensor, or close to sensors, such as to obtain sensor feedback data) within a pipeline, some examples of which may be an encoder model or provide sensor data to an encoder model. Transfer learning may be applied to sub-models deployed via hardware accelerators that are in this pipeline, particularly those closer to the sensors. It is expected that lower-level features in an inference pipeline will be more invariant among different use cases while higher level models (and their input features) are expected to vary more depending upon the task at hand. As such, a hybrid architecture, like that described, is expected to be particularly well-suited for implementation of on hardware machine-learning accelerators that trade-off some flexibility for higher performance.

The server 106 may analyze an obtained record of a model, or a plurality of records of instances of a model or models, such as a record or set of records selected as described above, to determine inferences about the parameters of one or more models. The selected records may correspond to models having a similar (or the same) input/output schema, and thus afford a comparison of parameters of those models. In some embodiments, the server 106 may determine a distribution of values (e.g., biases, weights, or activation thresholds, such as for a given neuron or node within a neural network) of respective parameters in a set of parameters. The server 106 may determine, based on the distribution, a range of the reported values within the parameter space, and optionally one or more thresholds, such as based on a standard deviation (or multiple thereof) of the distribution of values. In some cases, a measure of central tendency may be identified for the value of the parameter, like a mean, median, or mode. These metrics may be analyzed relative to one or more rules that infer whether the values of the parameter converge on a given value or within a range of values for the parameter (e.g., based on standard deviation or other metric). The server 106 may, in some cases, identify edge cases depending on model type to assign confidence to whether an identified range of values for the parameter corresponds to a threshold for a desired or undesired behaviors (e.g., like grasping an object with a threshold amount of force but below another threshold, or like over stressing a tendon or joint by attempting to drive an actuator of the tendon or joint beyond a stop condition), and determine an associated operator and threshold for the value that indicates (e.g., 90% confidence value>0.7 or 0.5>value>0.3, etc.). In some cases, the server 106 may analyze training iterations of a model as reported in the records, such as to determine directions of operators for thresholds. For example, if values less than 0.7 for a parameter across one or more training iterations (optionally across a plurality of models) correspond to a high number of undesirable robot state classifications, the server 106 may indicate a high confidence in a value of >0.7 for the parameter as more likely to yield desirable operation. In some cases, the server 106 may determine, for a parameter set of a given type of model, whether there is a high confidence a value of a parameter in the set will fall within a given range or will not be above or below a given threshold. The information about parameters and their values determined by inferences like those described above may be stored within the parameter data database 134 by the server 106. The server 106 may update these determinations as records are updated within the model database 136 to leverage existing deployments and their training experience to refine inferences about parameter values of robot control models 116.

The server 106 may leverage the information stored in the parameter data database 134 to initialize parameter values of a new model and indicate rules for adjustment of parameter values based on performance of the new model during training. Thus, for a new instance of the model, such as for an untrained system implementing the model, knowledge may be transferred based on the trained models (or based on their training experience) by a selection of values (e.g., initial values, and ranges of adjustment for those values) for a parameter according to the ranges, thresholds, and inferred rules for parameter values.

While it is expected that some parameters will have values that vary more substantially during post-transfer training, on-robot training may be significantly reduced, as the distance the model evolves through parameter space during training is expected to be reduced relative to other approaches. In some examples, the server 106 may improve simulated annealing techniques in accordance the above-described rules for parameter value selection, and with a reduced number of training operations, because a large search space (e.g., for a parameter value and combinations thereof across a plurality of parameters) may be significantly decreased. In some cases, these approximations of global optimization may approach the accuracy afforded by high-cost and time consuming but precise local optimum algorithms such as gradient descent or branch and bound (that in some use cases with high-dimensionality data may be practically precluded from use, which is not to suggest that these higher-cost approaches are disclaimed).

Moreover, by the above inference of rules for parameters values, exploration by adjustment of parameter values is not prohibited during training, but rather guided to within a sub-space of parameter values for which there exists a high confidence of a parameter value falling even if the full space were explored. In some examples, ranges or thresholds for parameter values may be expanded. such as by 10% or 20%, to afford a higher degree of exploration. In some examples, an expansion value for a range of a threshold that affords a greater degree of exploration may be determined based on a standard deviation value for the distribution of reported values and applied to a measure of central tendency (e.g., rather than the center of the distribution). In some examples, parameter values of a parameter set may be initialized to random values that are not prohibited by the rules inferred for the parameter.

Figure 4:
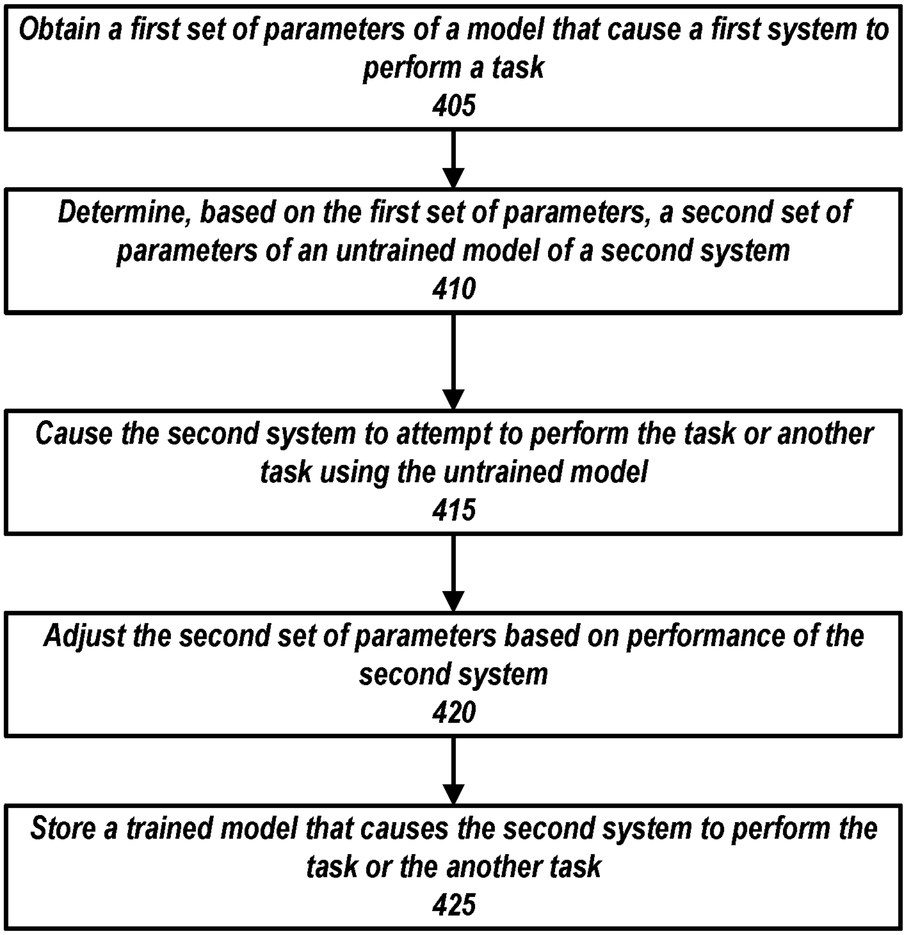
FIG. 4 is a flowchart of an example process for reducing teach times based on a prior trained model or models, in accordance with some example embodiments.
Figure 5:
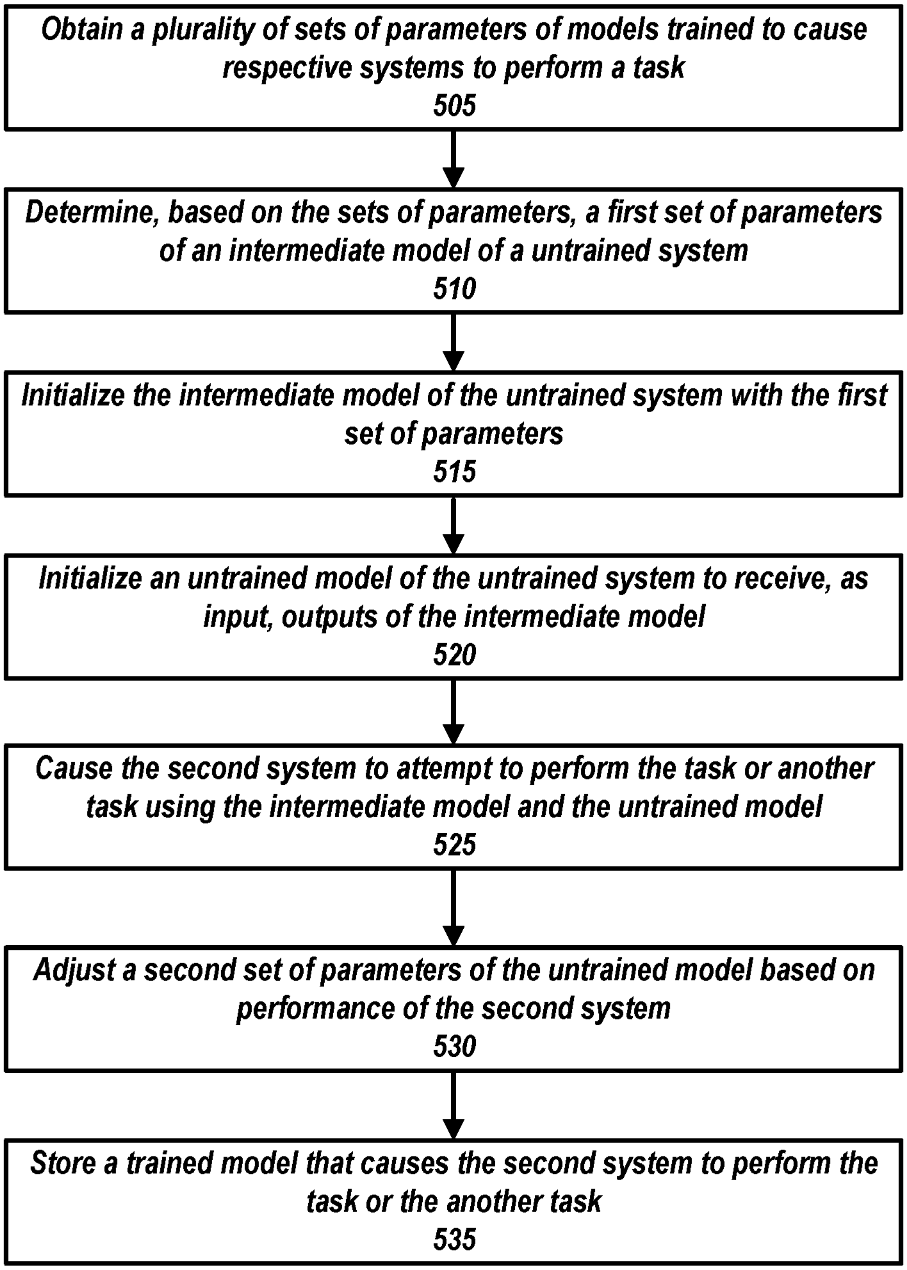
FIG. 5 is a flowchart of an example process for reducing teach times based on a prior trained model or models and an intermediate model, in accordance with some example embodiments.

FIGS. 4-5 are flowcharts of example training and control processes. The processing operations presented below are intended to be illustrative and non-limiting, as is the case with the other descriptions herein. In some embodiments, for example, the processing operations may be accomplished with one or more additional operations not described, or without one or more of the operations discussed. Additionally, the order in which the processing operations are illustrated (and described below) is not intended to be limiting. In some embodiments, the processing operations may be stored as computer program instructions on a non-transitory computer-readable storage medium, which may be loaded into a memory and executed by a processor. In some embodiments, the processing operations correspond to a method by which the various steps may be implemented. None of the preceding should be taken to suggest that other descriptions are limiting.

In some embodiments, the described processing operations may be implemented in one or more processors (e.g., computer processors, microcontrollers, and the like). The processors may execute some or all of the operations in response to instructions stored electronically on an electronic storage medium, such as a non-transitory computer-readable storage medium. The processors may be configured through hardware, firmware, or software to be specifically designed for execution of one or more of the operations of the described methods.

FIG. 4 is a flowchart of an example process 400 to reduce teach times based on a prior trained model or models, in accordance with some embodiments. In some examples, the models may have inputs or outputs structured in accordance with a given schema. For example, a plurality of encoder models may receive a set of inputs (e.g., sensor data) in a first schema and output a set of results (e.g., for a vector with reduced dimensionality for embedding within a latent embedding space) in a second schema. Other examples of models may include a given type of model to perform other similar types of tasks, such as process natural language text, images, or other input data set, to output a respective result (e.g., theme, classification, localization, detection or recognition of an object, etc.).

In a step 405, the process may include obtaining a set of parameters of a model that cause a first system to perform a task. For example, the set of parameters of the model may obtained from a robot that is controlled by the model (either locally or remotely) and that is trained to perform the task. A server may store records of models corresponding to a plurality of trained systems, such as robots trained to perform a task. Thus, the process may include obtaining, with a computer system, a first set of parameters of a first trained robot-control model of a first robot trained to perform a first task. In some cases, the process may include obtaining a plurality of sets of parameters from trained robot-control models of respective robots trained to perform the first task. Thus, for example, subsets of parameters having values that, among a population of trained instances of the model, exhibit relatively little variation may be determined. Parameters having values that exhibit relatively little variation (e.g., less than a threshold amount) may be inferred to be relatively tolerant (e.g., within the range, or above or below a threshold) to at least some variations across robot systems, which may include variances or differences between tactile sensors, properties of joints, members (e.g., dexterous or otherwise), tendons, image sensors, actuators or motors, which may be physical variances (e.g., due to manufacturing or other tolerances, wear, etc.) or situational variance (e.g., installed orientation, environmental, etc.) that may appear in sensor feedback data.

In a step 410, the process may include determining, based on the first set of parameters, a second set of parameters of an untrained model of a second system. In some cases, values of the first set of parameters may be copied over as values of the second set of parameters. In some cases, the process may include determining, with the computer system, based on the first set of parameters, a second set of parameters of a second robot-control model of a second robot before the second robot is trained to perform a second task. Initialization may be performed in accordance with one or more rules inferred with respect to a parameter value, such as based on the values of the parameter in one or more trained models. Some parameters may not be associated with one or more rules governing initialization and may be selected randomly within the parameter space, such as instead of randomly within an inferred range or above or below an inferred threshold based on analysis of the parameter values of the trained models. Selection may be performed to permit at least some exploration within the parameter space to avoid local optima, as the first robot and the second robot are expected to comprise parametric differences based on one or more of hardware, assembly, or material variations. Some embodiments may determine, with the computer system, based on the plurality of sets of parameters, the second set of parameters of the second robot-control model of the second robot before the second robot is trained to perform the second task, such as by determining selections of respective values for at least some parameters in the second set of parameters based on a minimum or maximum value among values of a corresponding parameter in the plurality of sets of parameters, or determining selections of respective values for at least some parameters in the second set of parameters based on a measure of central tendency among values of a corresponding parameter in the plurality of sets of parameters. For example, a value for a parameter in the second set of parameters may be selected based on a median, mode, or average of values for the parameter among the plurality of sets of parameters, and which in some examples may be randomized within a threshold of the measure of central tendency. Some examples may initialize at least some parameters in the second set of parameters to substantially match those in the first set and initialize at least some other parameters in the second set of parameters to within a range of those in the first set, and which initialization is performed may be based on a strength (e.g., degree) of convergence reported for parameter values of the parameter amount trained models. Some example embodiments may include initializing at least some other parameters in the second set of parameters to within a range of those in the first set by initializing a first portion within a range not exceeding potential maximum values based on corresponding parameter values in the first set of parameters, initializing a second portion within a range not exceeding potential minimum values based on corresponding parameter values in the first set of parameters, initializing a third portion within a range based on corresponding parameter values in the first set of parameters.

In steps 415 and 420, the process may include training of the second robot to perform the task or another task. Training may include adjusting copied over parameter values or adjusting parameter values of a downstream error correcting model while leaving copied-over parameter values unchanged. Training may include various processes by which model parameters are adjusted by selecting values that optimize output of an objective function. Training may include having a human operator control the second robot through a number of repetitions of the new task in the new environment, capturing data like in the training sets above, and then adjusting model parameters based on this training data in the manner described above. The number of repetitions needed may be substantially less than the number needed to attain acceptable performance without transfer learning. Training may also include simulating the second robot performing the new task in the new environment.

In some cases, in a step 415, the process may include causing the second system to attempt to (e.g., in a simulated scenario or in a real one) perform the task or another task using the untrained model. Step 415 may generate data indicative of the performance of the untrained model at controlling the robot. In turn, based on this performance data, in a step 420, the process may include adjusting the second set of parameters of the untrained robot control model based on performance of the second system. In some examples, the task attempted by the untrained system may be the same task as the trained system. In some examples, the tasks may differ, and while that different task may require additional training to learn, at least some bootstrapping of model performance for lower-level subsystems controlled by the model is expected (e.g., the parameter initialization may mitigate the robot from anomalous actions). In some examples, these steps of the process may include iterative training, such as to adjust parameter values. In some examples, a value of a parameter may be adjusted in accordance with the inferred rules, such as to minimize the explored parameter search space during training (e.g., requiring fewer iterations of adjustment). Example embodiments of the process may include training, with the computer system, the second robot to perform the second task by adjusting the second set of parameters of the second robot-control model based on performance of the second robot-control model in performing the second task. As a result of the training, a plurality of parameters in the first set of parameters of the first trained robot-control model may differ from a corresponding plurality of parameters in the second set of parameters of the second trained robot-control model of the second robot, such as to account for differences between one or more hardware, assembly, or material variations between the first robot and the second robot.

In a step 425, the process may include storing a trained model that causes the second system to perform the task or the other task. For example, after iterating through steps 415-420 to train the second system to adjust parameters of the untrained model, a given adjusted set of parameters may yield a trained model that causes the second system to perform a desired task. Thus, for example, the process may include storing, with the computer system, the second trained robot-control model of the second robot in memory. Additionally, the second robot may be deployed to perform the task for which it was trained, e.g., using the trained model having the adjusted parameter set that resulted from the training. Embodiments may store the trained model, such as the values of the adjusted parameter set, along with information about the adjustments performed during the iterative training steps to generate records of models and their performance to improve inferences by which initialization and adjustment rules may be determined to further reduce training times.

FIG. 5 shows a flowchart of a process 500 including operations for reducing teach times based on a prior trained model or models and an intermediate model, in accordance with one or more embodiments. In some examples, the models may have inputs or outputs structured in accordance with a given schema. For example, a plurality of encoder models may receive a set of inputs (e.g., sensor data) in a first schema and output a set of results (e.g., for a vector with reduced dimensionality for embedding within a latent embedding space) in a second schema. Other examples of models may include a given type of model to perform other similar types of tasks, such as process natural language text, images, or other input data set, to output a respective result (e.g., theme, classification, localization, detection or recognition of an object, etc.).

In a step 505, the process may include obtaining a plurality of sets of parameters of models trained to cause respective systems to perform a task. Some embodiments, however, may use a parameter set of a model of a first system, such as by obtaining, with a computer system, a first set of parameters of a first trained robot-control model of a first robot trained to perform a first task. For example, the set of parameters of the model may obtained from a robot that incorporating the model and that is trained to perform the task. In some cases, a plurality of sets of parameters of multiple instances of a same model (e.g., such as different instances corresponding to different training iterations) may be obtained, such as to determine how the parameters were adjusted during training to settle on their values as included in the trained model. In various examples, a server may store records of models corresponding to a plurality of trained systems, such as robots trained to perform a task. Thus, for example, regions of convergence of parameter values of one or more parameters may be determined. Parameters having values which produce regions of convergence or thresholds for reported values may thus be inferred to be relatively tolerant (e.g., within the range, or above or below a threshold) to at least some variations across robot systems, which may include variances or differences between tactile sensors, properties of joints, members (e.g., dexterous or otherwise), tendons, image sensors, actuators or motors, which may be physical variances (e.g., due to manufacturing or other tolerances, wear, etc.) or situational variance (e.g., installed orientation, environmental, etc.) that may appear in sensor feedback data.

In a step 510, the process may include determining, based on the sets of parameters, a first set of parameters of an intermediate model of an untrained system. Some example embodiments may pipeline an untrained model and an intermediate model. The untrained model may perform adjustments on outputs of the intermediate model in some examples, such as to account for differences between robots. The intermediate model may include a set of parameters which are initialized based on the values of parameters of a prior trained model, the untrained model permitting exploration by adjustment of those outputs based on system performance. In some examples, initialization of a parameter of the intermediate mode may be based on a plurality of values of a parameter from respective models of a plurality of trained systems. For example, the process may include determining, from the sets of parameters of the trained robot models, a range of values or value based on a measure of central tendency and one or more rules inferred with respect to selection of a parameter value. Determinations may also include determining that some parameters are not to be associated with one or more rules governing initialization within a specific range or above or below a threshold and instead to be selected randomly within the parameter space based on analysis of the parameter values of the trained models indicating a lack of convergence of values for the parameter. Examples determinations may include a range of values of a parameter in the trained models and a strength (e.g., degree) of convergence among those reported for parameter values.

In a step 515, the process may include initializing the intermediate model of the untrained system with the first set of parameters. In some examples, the process may include determining, based on a plurality of sets of parameters, a set of parameters for the intermediate robot-control model of the second robot and initializing the intermediate model with that set of parameters before the second robot is trained to perform the second task. Initialization may be performed in accordance with one or more rules inferred with respect to a parameter value, such as based on the values of the parameter in one or more trained models. Some parameters may not be associated with one or more rules governing initialization and may be selected randomly within the parameter space, such as instead of randomly within an inferred range or above or below an inferred threshold based on analysis of the parameter values of the trained models. Some embodiments may determine selections of respective values for at least some parameters based on a minimum or maximum value among values of a corresponding parameter in the plurality of sets of parameters, or determining selections of respective values for at least some parameters based on a measure of central tendency among values of a corresponding parameter in the plurality of sets of parameters. For example, a value for a parameter may be selected based on a median, mode, or average of values for the parameter among the plurality of sets of parameters, and which in some examples may be randomized within a threshold of the measure of central tendency. Some examples may initialize at least some parameters in the set of parameters to substantially match those of a trained model and initialize at least some other parameters that converge strongly to a measure of central tendency or value of the center of a distribution.

In a step 520, the process may include initializing an untrained model of the untrained system to receive, as input, outputs of the intermediate model. For example, a trained robot-control model of the second robot may include a first processing stage and a second processing stage, the first processing stage may include the intermediate control model and the second processing stage may include a trained version of the untrained robot control model. The untrained model may be configured to receive inputs from the intermediate model. The untrained model may have a set of parameters, which in some examples, may also be initialized. In some examples, a plurality of parameters in the first set of parameters of the intermediate robot-control model differ from a corresponding plurality of parameters in the second set of parameters of the second trained robot-control model of the second robot, such as the result of exploration, and the differences between at least some of the plurality of parameters are based on one or more hardware, assembly, or material variations between the second robot and another (or other) trained robot(s) upon which the parameters of the intermediate model are based. Adjustment to the parameters of the untrained model may be permitted in accordance with one or more rules to explore a portion of the parameter space within which a parameter value is expected. Thus, for example, the untrained model may be viewed as performing the exploration to determine optimum adjustments with respect to an untrained robot system. Some examples of the process may include selecting thresholds for values of at least some parameters in the second set of parameters of the untrained model based on a standard deviation among values of a corresponding parameter in the plurality of sets of parameters.

In some examples, the parameters of the untrained model may be a different set of parameters from those of the intermediate model. In some examples, the parameter set of the untrained model may correspond to a reduced set of parameters, as the number of inputs (e.g., outputs of the intermediate model) to the untrained model may be smaller than the number of inputs to the intermediate model. In some other examples, the parameters set of the untrained model may correspond to an expanded set of parameters, as the number of inputs may include the outputs of the intermediate model and the inputs of the intermediate model. In some examples, the parameter sets may be the same (e.g., have a correspondence of parameters, although the respective values of parameters may differ). In some embodiments, results of training may be consolidated into a single model rather than a pipeline (e.g., the pipeline of models may be utilized to train a single model by an off-robot computing system or the adjustments to the untrained model may be utilized to adjust the intermediate model to generate a single trained model).

In steps 525 and 530, the process may include training of the second robot to perform the task or another task. Training may include capturing training sets by having a human control the second robot as it performs a new task in a new environment and training on that training set in the manner described above. In some embodiments, in a step 525, the process may include causing the second system to attempt to perform the task or another task using the intermediate model and the untrained model. In turn, in a step 530, the process may include adjusting the second set of parameters of the untrained robot control model based on performance of the second system. The training may include one or more of the techniques described herein, which may include but is not limited to on-robot training, either automated (e.g., recorded training inputs provided to other robot systems, like recorded demonstrations) or by teleoperation. For example, in a step 525, the process may include causing the second system to attempt to perform the task or another task using the intermediate model and the untrained model. Step 525 may generate data indicative of the performance of the intermediate model and untrained model at controlling the robot. In turn, based on this performance data, in a step 530, the process may include adjusting the second set of parameters of the untrained robot control model based on performance of the second system. In some examples, the task attempted by the untrained system may be the same task as the trained system. In some examples, the tasks may differ, and while that different task may require additional training to learn, at least some bootstrapping of model performance for lower-level subsystems controlled by the models is expected (e.g., the parameter initialization for the intermediate model may mitigate the robot from anomalous actions as adjustment ranges for some parameters of the untrained model may be more gradual to fine tune performance).

In some examples, these steps of the process may include iterative training, such as to adjust parameter values of the untrained model to enhance performance of the second system. In some examples, a value of a parameter of the untrained model may be adjusted in accordance with inferred rules, such as to minimize the explored parameter search space during training (e.g., requiring fewer iterations of adjustment). Example embodiments of the process may include training, with the computer system, the second robot to perform a second task by adjusting the second set of parameters of the untrained robot-control model based on performance of the intermediate robot-control model in performing the second task. Adjusting of parameter values in the second set of parameters of the untrained second robot-control model modifies one or more outputs corresponding to performance of the second task. The process may include training the second robot to perform the second task by adjusting the second set of parameters of the untrained robot-control model based on performance of the intermediate robot-control model in performing the second task without adjusting parameters of the intermediate robot-control model. After a plurality of adjustments to the second set of parameters that yield an adjusted set of parameters that causes the second robot to perform the task, the adjusted set of the parameters may be stored as parameters of the trained version of the untrained robot control model.

In a step 535, the process may include storing a trained model that, when executed, causes the second system to perform the task or the other task. For example, after iterating through steps 525-530 to train the second system to adjust parameters of the untrained model, a given adjusted set of parameters may yield a trained model that causes the second system to perform a desired task. Thus, for example, the process may include storing, with the computer system, the second trained robot-control model of the second robot in memory. Additionally, the second robot may optionally be deployed to perform the task for which it was trained, e.g., using the trained model having the adjusted parameter set of the untrained model that resulted from the training. Embodiments may store the trained model, such as the values of the adjusted parameter set of the untrained model and the initialized values of the intermediate model (e.g., where they differ from other intermediate models), along with information about the adjustments performed during the iterative training steps to generate records of models and their performance to improve inferences by which initialization and adjustment rules may be determined to further reduce training times. In some examples, the parameter set of the intermediate model and the adjusted parameter set of the trained version of the untrained model may be processed to determine a single parameter set of a trained model having the input/output schema of the intermediate model (e.g., to utilize a single trained model in place of the intermediate model and trained version of the untrained model in combination as the trained model pipeline).

Figure 6:
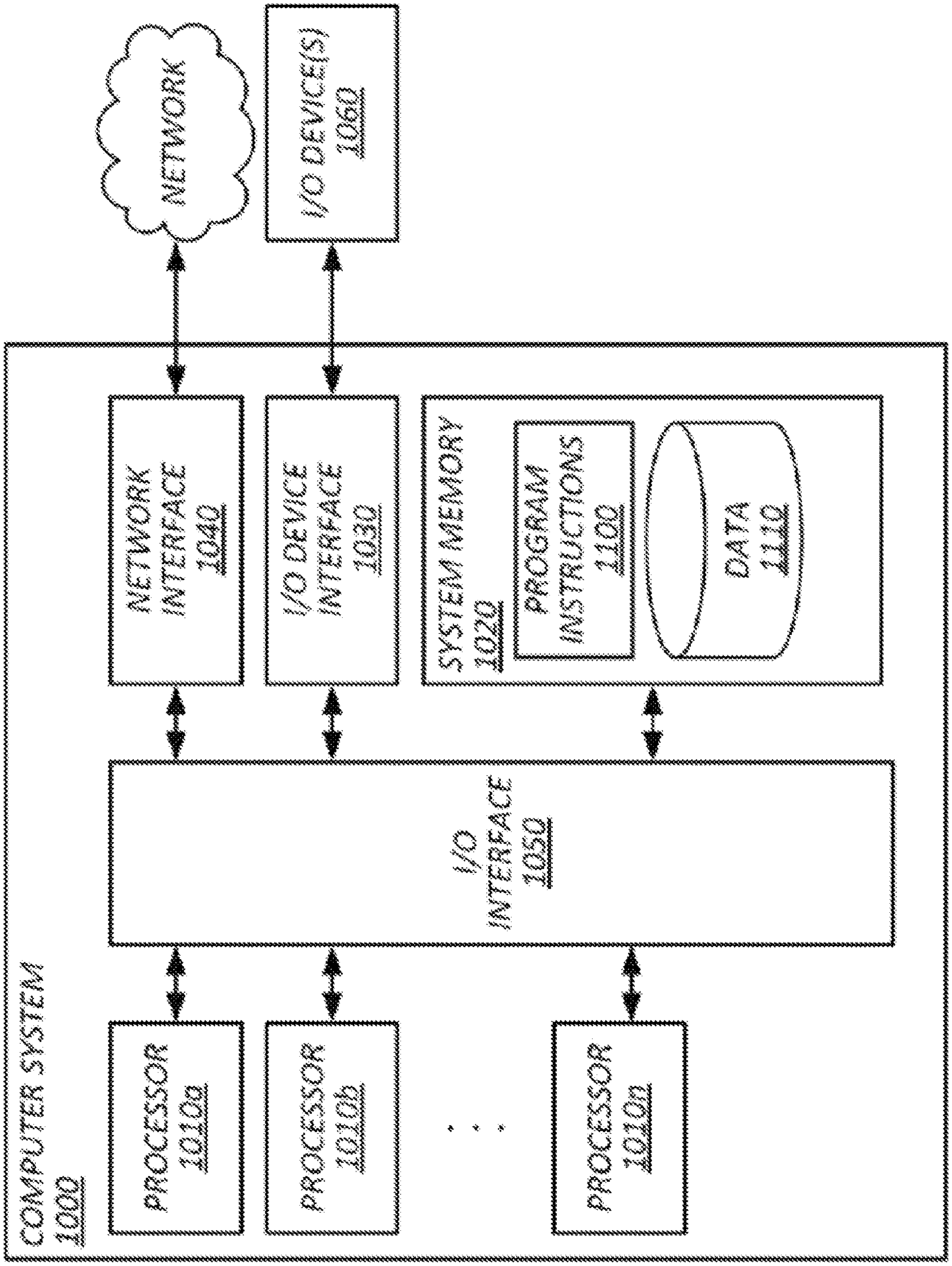
FIG. 6 is a physical architecture block diagram that shows an example of a computing device (or data processing system) by which some aspects of the above techniques may be implemented.

FIG. 6 is a physical architecture block diagram that shows an example of a computing device (or data processing system) by which some aspects of the above techniques may be implemented. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010 *a*-1010 *n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) can be said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description is not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood when considered in view of the following enumerated embodiments:

Embodiment 1: An embodiment of a system, comprising a tangible, non-transitory, machine-readable medium storing instructions that when executed by one or more processors effectuate operations comprising: obtaining, with a computer system, a first set of parameters of a first trained robot-control model of a first robot trained to perform a first task; determining, with the computer system, based on the first set of parameters, a second set of parameters of a second robot-control model of a second robot before the second robot is trained to perform a second task; training, with the computer system, the second robot to perform the second task by adjusting the second set of parameters of the second robot-control model based on performance of the second robot-control model in performing the second task; and storing, with the computer system, the second trained robot-control model of the second robot in memory.

Embodiment 2: The system of embodiment 1, wherein: the first task is different from the second task; and the system further comprises the second robot, the second robot comprising or being communicatively coupled to the memory storing the second trained robot-control model.

Embodiment 3: The system of embodiment 2, wherein: the second robot is a humanoid robot that has 20 or more degrees of freedom and the second robot has different dynamics from the first robot.

Embodiment 4: The system of any one of embodiments 1-3, wherein: a plurality of parameters in the first set of parameters of the first trained robot-control model differ from a corresponding plurality of parameters in the second set of parameters of the second trained robot-control model of the second robot; and the corresponding plurality of parameters are weights and biases of a neural network initialized to have values of the first set of parameters before training the second robot.

Embodiment 5: The system of any one of embodiments 1-4, wherein: the second robot-control model is trained with steps for transfer learning based on the first trained robot-control model.

Embodiment 6: The system of any one of embodiments 1-5, wherein: the second robot-control model comprises an instance of the first robot-control model pipelined with an error correcting model that is adjusted when training the second robot-control model.

Embodiment 7: The system of any one of embodiments 1-6, wherein: the second robot-control model is initialized before training based on the first robot-control model and then trained by adjusting the parameters of the second robot-control model with simulated annealing.

Embodiment 8: The system of any one of embodiments 1-7, wherein: the first robot-control model is trained by computing partial derivatives of respective parameters with respect to an objective function and adjusting the respective parameters in directions the partial derivatives indicate locally optimize the objective function; and determining, based on the first set of parameters, the second set of parameters of a second robot-control model of a second robot before the second robot is trained to perform a second task comprises initializing parameters of a first subset of sub-models of the second robot-control model based on the first set of parameters and not initializing a second subset of sub-models of the second robot-control model based on the first set of parameters.

Embodiment 9: The system of embodiment 8, wherein the first subset of sub-models comprises an encoder configured to transform a plurality of channels of sensor data into an embedding vector in a latent space that has lower dimensionality than the plurality of channels of sensor data and the second subset of sub-models comprises a policy of a reinforcement learning model.

Embodiment 10: The system of any one of embodiments 1-9, wherein: obtaining a first set of parameters of a first trained robot-control model of a first robot trained to perform a first task comprises: obtaining a plurality of sets of parameters from trained robot-control models of respective robots trained to perform the first task; and determining, based on the first set of parameters, a second set of parameters of a second robot-control model of a second robot before the second robot is trained to perform a second task comprises: determining, with the computer system, based on the plurality of sets of parameters, the second set of parameters of the second robot-control model of the second robot before the second robot is trained to perform the second task.

Embodiment 11: The system of any one of embodiments 1-10, wherein determining, with the computer system, based on the first set of parameters, a second set of parameters of a second robot-control model of a second robot before the second robot is trained to perform a second task comprises: initializing at least some parameters in the second set of parameters to substantially match those in the first set; and initializing at least some other parameters in the second set of parameters to within a range of those in the first set.

Embodiment 12: The system of embodiment 11, wherein initializing at least some other parameters in the second set of parameters to within a range of those in the first set comprises: initializing a first portion within a range not exceeding potential maximum values based on corresponding parameter values in the first set of parameters; initializing a second portion within a range not exceeding potential minimum values based on corresponding parameter values in the first set of parameters; and initializing a third portion within a range based on corresponding parameter values in the first set of parameters.

Embodiment 13: An embodiment of a tangible, non-transitory, machine-readable medium storing instructions that when executed by one or more processors effectuate operations comprising: obtaining, with a computer system, a first set of parameters of a first trained robot-control model of a first robot trained to perform a first task; initializing, with the computer system, an intermediate robot-control model of a second robot based on the first set of parameters; configuring, with the computing system, an untrained robot-control model of the second robot to receive, as input, outputs of the intermediate robot-control model based on the first set of parameters, the untrained robot-control model comprising a second set of parameters; training, with the computer system, the second robot to perform a second task by adjusting the second set of parameters of the untrained robot-control model based on performance of the intermediate robot-control model in performing the second task; and storing, with the computer system, a trained robot-control model of the second robot in memory.

Embodiment 14: The medium of embodiment 13, wherein: the first task is a same task as the second task.

Embodiment 15: The medium of embodiment 13, wherein: the first robot and the second robot comprise parametric differences based on one or more of hardware, assembly, or material variations, and adjusting the second set of parameters of the untrained second robot-control model modifies one or more outputs corresponding to performance of the second task.

Embodiment 16: The medium of embodiment 13, wherein: a plurality of parameters in the first set of parameters of the intermediate robot-control model differ from a corresponding plurality of parameters in the second set of parameters of the second trained robot-control model of the second robot; and differences between at least some of the plurality of parameters are based on one or more hardware, assembly, or material variations between the first robot and the second robot.

Embodiment 17: The medium of embodiment 13, wherein: obtaining a first set of parameters of a first trained robot-control model of a first robot trained to perform a first task comprises: obtaining a plurality of sets of parameters from trained robot-control models of respective robots trained to perform the first task; initializing, with the computer system, an intermediate robot-control model of a second robot based on the first set of parameters comprises: determining, with the computer system, based on the plurality of sets of parameters, a third set of parameters, the intermediate robot-control model of the second robot being initialized with the third set of parameters before the second robot is trained to perform the second task.

Embodiment 18: The medium of embodiment 17, wherein configuring, with the computing system, an untrained robot-control model of the second robot to receive, as input, outputs of the intermediate robot-control model based on the first set of parameters, the untrained robot-control model comprising a second set of parameters, comprises: selecting thresholds for values of at least some parameters in the second set of parameters based on a standard deviation among values of a corresponding parameter in the plurality of sets of parameters.

Embodiment 19: The medium of any one of embodiments 13-18, wherein: the trained robot-control model of the second robot comprises a first processing stage and a second processing stage, the first processing stage comprising the intermediate control model and the second processing stage comprising a trained version of the untrained robot control model.

Embodiment 20: The medium of embodiment 19, wherein: training the second robot to perform the second task comprises: adjusting the second set of parameters of the untrained robot-control model based on performance of the intermediate robot-control model in performing the second task without adjusting parameters of the intermediate robot-control model, and storing, after a plurality of adjustments to the second set of parameters that yield an adjusted set of parameters that causes the second robot to perform the task, the adjusted set of the parameters as parameters of the trained version of the untrained robot control model.

Embodiment 21: A method, comprising: the operations of any one of embodiments 1-20.

The invention claimed is:

1. A computing system comprising:
- one or more memories;
- one or more processing units coupled to the one or more memories; and
- one or more computer-readable storage media storing instructions that, when executed, cause the computing system to perform operations comprising:
  - obtaining a first set of parameters of a first trained robot-control model of a first robot trained to perform a first task;
  - prior to training a second robot to perform a second task, initializing an intermediate robot-control model of the second robot based on the first set of parameters;
  - configuring an untrained robot-control model of the second robot having a second set of parameters to receive, as input, outputs of the intermediate robot-control model that has been initialized based on the first set of parameters;
  - training the second robot to perform the second task, wherein the training comprises:

causing the second robot to perform the second task using the intermediate robot-control model and the untrained robot-control model; and adjusting the second set of parameters of the untrained robot-control model based on performance of the second robot in performing the second task; and storing a second trained robot-control model of the second robot including the intermediate robot-control model with the first set of parameters and a trained version of the untrained robot-control model with the adjusted second set of parameters in memory.

2. The computing system of claim 1, wherein the first robot and the second robot comprise parametric differences based on one or more of hardware, assembly, or material variations.

3. The computing system of claim 1, wherein obtaining the first set of parameters of the first trained robot-control model comprises obtaining a plurality of sets of parameters from trained robot-control models of respective robots trained to perform the first task.

4. The computer system of claim 3, wherein initializing the intermediate robot-control model comprises determining a third set of parameters based on the plurality of sets of parameters and initializing the intermediate robot-control model with the third set of parameters.

5. The computer system of claim 4, wherein configuring the untrained robot-control model comprises selecting thresholds for values of at least some parameters in the second set of parameters based on a standard deviation among values of a corresponding parameter in the plurality of sets of parameters.

6. The computer system of claim 1, wherein the second set of parameters are adjusted without adjusting the parameters of the intermediate robot-control model.

7. The computer system of claim 1, wherein the first trained robot-control model comprises an encoder model and a reinforcement learning model that are concurrently trained by adjusting parameters of both the encoder model and a deep reinforcement learning model.

8. The computer system of claim 1, wherein the first task is different from the second task.

9. The computer system of claim 1, wherein the second set of parameters are adjusted with simulated annealing.

10. The computer system of claim 1, wherein the intermediate robot-control model comprises an encoder configured to transform a plurality of channels of sensor data into an embedding vector in a latent space that has lower dimensionality than the plurality of channels of sensor data, and wherein the untrained robot-control model comprises a policy of a reinforcement learning model.

11. A computing system comprising:

one or more memories;

one or more processing units coupled to the one or more memories; and one or more computer-readable storage media storing instructions that, when executed, cause the computing system to perform operations comprising:

obtaining a first set of parameters of a first trained robot-control model of a first robot trained to perform a first task;

accessing an intermediate robot-control model and an untrained robot control model of a second robot, wherein the second robot differs from the first robot in at least one of hardware, assembly, or material;

prior to training the second robot to perform a second task, initializing an intermediate robot-control model of the second robot based on the first set of parameters;

configuring an untrained robot-control model of the second robot to receive, as input, outputs of the intermediate robot-control model that has been initialized based on the first set of parameters, the untrained robot-control model having a second set of parameters;

training the second robot to perform the second task, wherein the training comprises:

causing the second robot to perform the second task using the intermediate robot-control model and the untrained robot-control model, wherein the second task is the same as the first task; and adjusting the second set of parameters of the untrained robot-control model based on performance of the second robot in performing the second task; and storing a second trained robot-control model including the intermediate robot-control model with the first set of parameters and a trained version of the untrained robot-control model with the adjusted second set of parameters in memory.

12. A method implemented by a computing system, the method comprising:

obtaining a first set of parameters of a first trained robot-control model of a first robot trained to perform a first task;

accessing an intermediate robot-control model and an untrained robot control model of a second robot, wherein the second robot differs from the first robot in at least one of hardware, assembly, or material;

prior to training the second robot to perform a second task, initializing the intermediate robot-control model of the second robot based on the first set of parameters;

configuring the untrained robot-control model of the second robot to receive, as input, outputs of the initialized intermediate robot-control model;

training the second robot to perform the second task, the training comprising:

causing the second robot to perform the second task using the intermediate robot-control model and the untrained robot-control model; and adjusting a second set of parameters of the untrained robot-control model based on performance of the second robot in performing the second task; and storing a second trained robot-control model including the intermediate robot-control model initialized with the first set of parameters and a trained version of the untrained robot-control model with the adjusted second set of parameters in memory.

13. The method of claim 12, wherein obtaining the first set of parameters of the first trained robot-control model comprises obtaining a plurality of sets of parameters from trained robot-control models of respective robots trained to perform the first task.

14. The method of claim 13, wherein initializing the intermediate robot-control model comprises determining a third set of parameters based on the plurality of sets of parameters and initializing the intermediate robot-control model with the third set of parameters.

15. The method of claim 14, wherein configuring the untrained robot-control model comprises selecting thresholds for values of at least some parameters in the second set of parameters based on a standard deviation among values of a corresponding parameter in the plurality of sets of parameters.

16. The method of claim 12, wherein the second set of parameters of the untrained robot-control model are adjusted without adjusting the parameters of the intermediate robot-control model.

17. The method of claim 12, wherein the first trained robot-control model comprises an encoder model and a reinforcement learning model that are concurrently trained by adjusting parameters of both the encoder model and a deep reinforcement learning model.

18. The method of claim 12, wherein the first task is different from the second task.

19. The method of claim 12, wherein the second set of parameters of the untrained robot-control model are adjusted with simulated annealing.

20. The method of claim 12, wherein the intermediate robot-control model comprises an encoder configured to transform a plurality of channels of sensor data into an embedding vector in a latent space that has lower dimensionality than the plurality of channels of sensor data, and wherein the untrained robot-control model comprises a policy of a reinforcement learning model.

* * * * *